United States Patent
Samuel et al.

(10) Patent No.: US 12,073,198 B2
(45) Date of Patent: *Aug. 27, 2024

(54) PREVENTING GARBAGE OBJECT ACCUMULATION ON MINIMAL RUNTIMES WHILE SUPPORTING AN IMPLICIT DEALLOCATION PROGRAMMING EXPERIENCE

(71) Applicant: Temper Systems, Inc., Dover, DE (US)

(72) Inventors: Michael Vincent Samuel, Princeton, NJ (US); Jasvir Nagra, Redwood City, CA (US)

(73) Assignee: Temper Systems, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,110

(22) Filed: Jun. 26, 2023

(65) Prior Publication Data
US 2024/0028316 A1 Jan. 25, 2024

Related U.S. Application Data

(63) Continuation of application No. 17/212,477, filed on Mar. 25, 2021, now Pat. No. 11,698,778, which is a
(Continued)

(51) Int. Cl.
*G06F 8/41* (2018.01)
*G06F 16/901* (2019.01)

(52) U.S. Cl.
CPC .......... *G06F 8/437* (2013.01); *G06F 16/9024* (2019.01)

(58) Field of Classification Search
None
See application file for complete search history.

(56) References Cited

U.S. PATENT DOCUMENTS

| 6,742,175 B1 | 5/2004 | Brassard |
| 2010/0037213 A1 | 2/2010 | Meijer et al. |

(Continued)

FOREIGN PATENT DOCUMENTS

JP 2013-054650 A 3/2013

OTHER PUBLICATIONS

Notice of Allowance, CA App. No. 3205948, Feb. 19, 2024, 1 page.
(Continued)

*Primary Examiner* — Qing Chen
(74) *Attorney, Agent, or Firm* — NICHOLSON DE VOS WEBSTER & ELLIOTT LLP

(57) ABSTRACT

Computer-implemented techniques for preventing garbage object accumulation on minimal runtimes. The techniques include checking whether source code written in a source programming language that does not require the programmer to explicitly program when deallocation happens can run within a runtime that provides little or no support for implicit deallocation. At the same time, the techniques ensure that objects in minimal runtimes are deallocated in a timely manner. In one aspect, the techniques encompass generating a compile-time alert (e.g., an error or warning message) to a programmer of source code or halting compilation of the source code upon detecting a data type definition in the source code with the potential for reference cycles. With the techniques, the programmer is provided with an implicit deallocation experience while producing program fragments that interoperate with minimal runtimes that provide no or only minimal support for implicit deallocation (e.g., provide only reference counting).

19 Claims, 23 Drawing Sheets

Related U.S. Application Data continuation of application No. 17/131,583, filed on Dec. 22, 2020, now Pat. No. 10,963,228.

(56) References Cited

U.S. PATENT DOCUMENTS

2013/0042258 A1 2/2013 Rector et al.
2016/0140036 A1 5/2016 O'Meara et al.

OTHER PUBLICATIONS

Office Action, CA App. No. 3205948, Sep. 22, 2023, 5 pages.
Office Action, JP App. No. 2023-548181, Jan. 16, 2024, 7 pages (5 pages of English Translation and 2 pages of Original Document).
International Search Report and Written Opinion, PCT App. No. PCT/US2021/064529, Jul. 8, 2022, 15 pages.
International Search Report and Written Opinion, PCT App. No. PCT/US2021/064529, Sep. 27, 2022, 14 pages.
Non-Final Office Action, U.S. Appl. No. 17/212,477, Sep. 21, 2022, 9 pages.
Notice of Allowance, U.S. Appl. No. 17/131,583, Feb. 11, 2021, 17 pages.
Notice of Allowance, U.S. Appl. No. 17/212,477, Feb. 24, 2023, 18 pages.
Proust, Raphael, "ASAP: As Static as Possible Memory Management", Technical Report, No. 908, dated Jul. 2017, 146 pages w/ concise explanation of relevance.
Ullrich et al., "Counting Immutable Beans", Reference Counting Optimized for Purely Functional Programming, dated Mar. 5, 2020, 13 pages w/ concise explanation of relevance.
Viera et al., "Haskell, Do You Read Me? Constructing and Composing Efficient Top-down Parsers at Runtime", Haskell'08, ACM, Sep. 25, 2008, pp. 63-74.
Office Action, EP App. No. 21844564.1, Apr. 15, 2024, 5 pages.

PREVENTING GARBAGE OBJECT ACCUMULATION ON MINIMAL RUNTIMES WHILE SUPPORTING AN IMPLICIT DEALLOCATION PROGRAMMING EXPERIENCE

CROSS-REFERENCE TO RELATED APPLICATIONS

This application is a continuation of U.S. patent application Ser. No. 17/212,477, filed Mar. 25, 2021 (now U.S. Pat. No. 11,698,778 issued Jul. 11, 2023), which is a continuation of U.S. patent application Ser. No. 17/131,583, filed Dec. 22, 2020 (now U.S. Pat. No. 10,963,228 issued Mar. 30, 2021), each of which is hereby incorporated by reference. The Applicant hereby rescinds any disclaimer of claim scope in the prior applications including any disclaimer of claim scope in the prosecution histories thereof.

TECHNICAL FIELD

The present disclosure relates to computer programming language compilers. More specifically, the present disclosure relates to computer-implemented techniques for preventing garbage object accumulation on minimal runtimes.

BACKGROUND

Computers are very powerful tools for performing a wide variety of tasks. Computer programs are a common mechanism for accomplishing custom processing tasks using computer systems. A typical program is a set of programmed instructions (source code) that is compiled into an executable form. The executable form is then executed by a computer system to accomplish a task. For example, a set of C programming language instructions may be compiled into a set of x86 processor-executable instructions. The set of processor-executable instructions may then be executed by an x86-compatible processor to accomplish a processing task.

Between the set of programmed instructions as programmed by a human computer programmer and the executable form, a compiler is typically used as a translator. In essence, the compiler shields the programmer from knowing or even caring about underlying executable form details. Typically, all programmed instructions authored by programmers are translated by the compiler. For example, the compiler may perform data type checking, symbol table construction, register allocation, and instruction scheduling, all without programmer knowledge of the underlying compiler implementation. In this manner, the compiler provides programmers with a tool to reason about and express a processing task at a higher-level using a high-level programming language that alleviates the programmer from the cognitive burden of worrying about low-level execution details. The general construction and operation of compilers is well known in the art. See, e.g., Aho, A., Sethi, R., and Ullman, J.; "Compilers: Principles, Techniques, and Tools," Second Edition, 2007.

One purpose of some compilers is cross-compilation. A cross-compiler may be defined as a compiler that produces two or more outputs from one input. For example, a cross-compiler may accept as input source code written a source programming language that is both human and computer-readable and produce one or more executable forms of the source code as outputs. Consider, for instance, a cross-compiler for the C programming language. Such a cross-compiler might produce from C source code an x86 executable (e.g., for execution on computers configured with the MICROSOFT WINDOWS operating system), an ARM executable (e.g., for execution on mobile computing devices configured with the ANDROID operating system), and a WASM executable (e.g., for execution on a virtual stack machine supported by a web browser application).

There are also source-to-source compilers. A source-to-source compiler may be defined as a compiler that accepts as input source code written in a source programming language that is both human and computer-readable and outputs source code for one or more programming language targets that are also both human and computer readable. For example, the HAXE compiler can translate source code written in the HAXE programming language into a handful of structurally similar programming language targets. More information on HAXE is available on the Internet in the haxe.org Internet domain.

Today, many widely used programming languages support implicit object deallocation at runtime. Deallocation may be defined as the runtime operation of freeing up computer memory space occupied by unnecessary objects so that the space can be reused. Deallocation is timely at runtime if the space is eventually freed such as, for example, soon after the object becomes unnecessary or when the executing program determines that the space is needed for other purposes. An object that is not deallocated in a timely manner is sometimes referred to as a memory "leak."

Some programming languages require explicit programmed deallocation while others support implicit runtime deallocation. With explicit deallocation, a computer program is expressly programmed by the programmer to allocate and deallocate memory space for runtime objects using programming language operations such as "new," "malloc," "free," "delete," or the like. With implicit runtime deallocation, the programmer is relieved from the responsibility of expressly programming the program to allocate and deallocate memory space for runtime objects. Instead, a programming language runtime takes care of timely deallocating runtime objects.

To support implicit object deallocation at runtime, programming language runtimes may provide runtime memory management services including garbage collectors that periodically identify objects in memory that can be safely deallocated or cycle collectors that identify groups of objects in memory that mutually reference one another but that are not referenced by other parts of the executing program. The memory space occupied by the objects can then be freed up for other uses.

There are also smart references. A smart reference combines memory address bits with other bits that control how the region of memory will be deallocated. An example of a kind of smart reference is a reference counting reference that keeps a count of the number of program elements that require the referenced object. When the count reaches zero, that object may be safely deallocated. Smart references may be used with some programming languages that do not provide runtime support for implicit deallocation. The modern C++ programming language is one example.

Today, most computer programmers are accustomed to programming in programming languages that support implicit deallocation at runtime. Unfortunately, there are still many widely used programming languages that do not support implicit deallocation at runtime. Examples of such programming languages include C, C++, OBJECTIVE-C, and RUST. A cross-compiler or source-to-source compiler that is designed to support all widely used programming languages cannot assume that all targets provide implicit deallocation at runtime The techniques disclosed herein address this and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The techniques are illustrated by way of example, and not by way of limitation, in the figures of the accompanying drawings and in which like reference numerals refers to similar elements and in which.

SUMMARY

Figure 1:
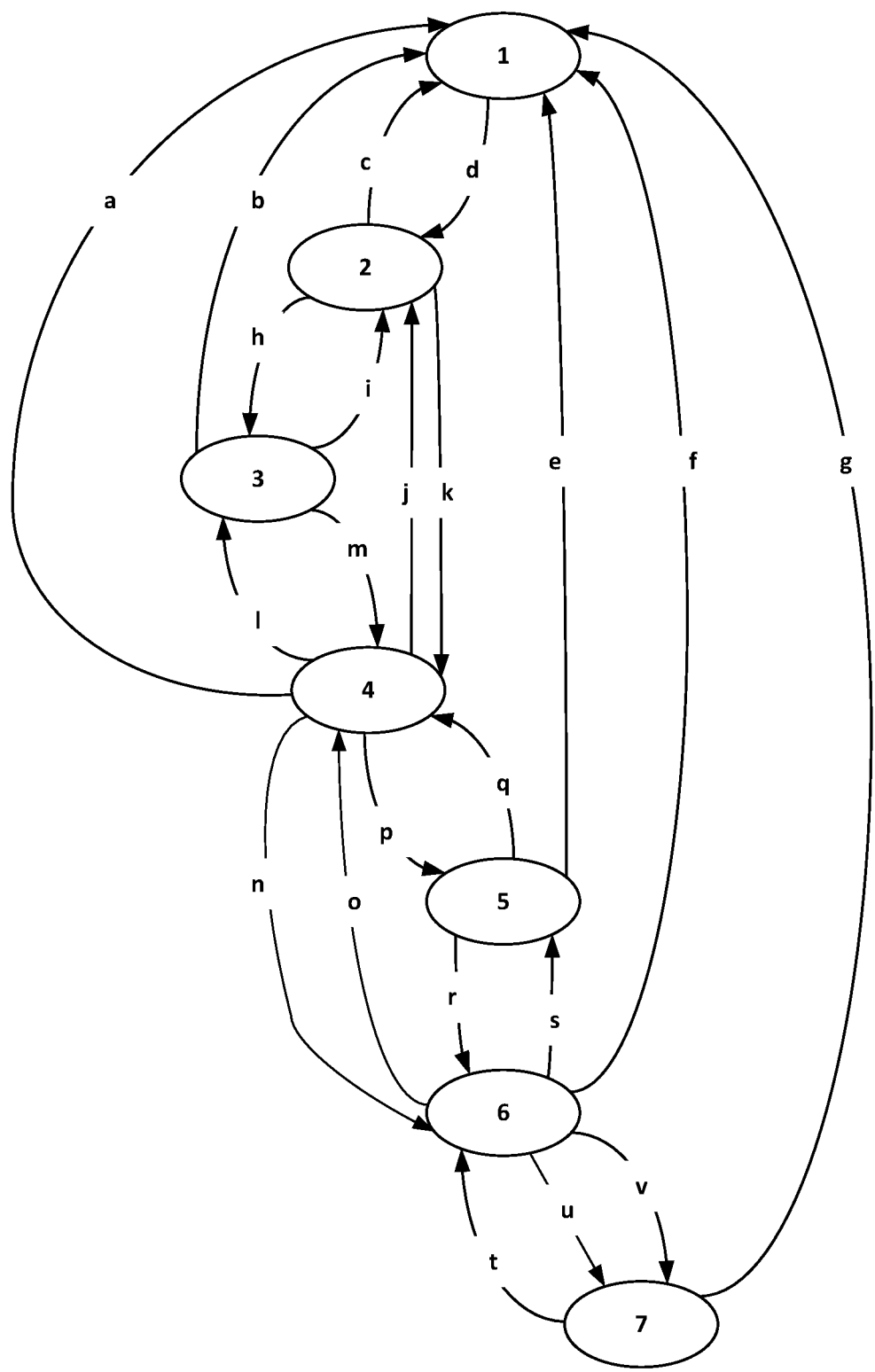
FIG. 1 depicts a first example of a cyclic data structure.

The General Overview section of the Detailed Description below provides a useful overview of the techniques for preventing garbage object accumulation on minimal runtimes.

In some embodiments, a compiler or data type checking tool checks data type definitions in programming language source code and brings to the attention of the programmer any definitions that may allow reference cycles at runtime. In some embodiments, the compiler or data type checking tool takes into account how a computer program uses type definitions.

In some embodiments, the compiler or data type checking tool takes into account which property definitions of data type definitions in programming language source code are read-only. In some embodiments, the compiler or data type checking tool uses explicit hints in the programming language source code to determine whether a property definition is read-only including keywords such as "const," "final," or "read-only,' or annotations or the absence of explicit hints with the opposite meaning such as "mutable" or "writeable." In some embodiments, the compiler or data type checking tool inspects a property definition to infer read-only-ness. For example, read-only-ness for a property definition may be inferred when none of the programming language source code that could set a property after its initial value is assigned does so. In some embodiments, the compiler or data type checking tool inserts extra instructions into programming language source code or an executable program to detect or enforce needed read-only-ness. For example, the extra instructions may cause assignments of values to a property after the property is initialized to fail.

In some embodiments, the compiler or data type checking tool takes into account which property definitions in the programming language source code are initialized early, before any reference to the containing object. The early concept is used to prevent objects from creating reference cycles to themselves during property initialization. Early initialization may be inferred based on inspection of programming language source that initializes properties. Early initialization may also be based on an explicit hint. The explicit hint may cause other checks of the programming language source code that might perform initialization such as, for example, checking a constructor definition of a data type to check temporal relationships between uses of "this" reference as a value and property assignments. The compiler or data type checking tool may insert extra instructions into programming language source code or an executable program to detect or enforce needed early-ness. For example, the extra instructions may cause attempts to initialize a property after the "this" reference to the object containing the property is used as a value to fail.

In some embodiments, the compiler or data type checking tool takes into account whether a data type definition is closed (e.g., whether all its sub-types are known to the compiler or data type checking tool). Closed-ness may be based on explicit hints in the programming language source code such as by the presence of keywords or annotations like "final," "closed," "sealed," or the absence of hints with the opposite sense like "open." Closed-ness may be inferred based on context. For example, if access to a data type definition is restricted by information hiding mechanisms to some modules of the programming language source code, and there exist no definitions in the programming language source code of sub-types within those modules, then closedness may be inferred for the data type definition. Closedness may also be used to allow substituting case-based reasoning for reasoning about a common super data type.

In some embodiments, the compiler or data type checking tool takes into account whether a data type definition is concrete (e.g., whether there can exist values of that data type that are not values of a sub data type of that data type). A concrete data type may be contrasted with an abstract data type that is not sufficient to describe a value but from which concrete sub data types may be derived. Concrete-ness may be based on explicit hints such as, for example, by the presence of a keyword or annotation like "concrete," or the absence of a keyword or annotation like "abstract." Concrete-ness may be inferred based on context such as, for example, by the user of the data type in the programming language source code to construct objects, or by the absence of any missing pieces that would prevent construction of a fully-functioning object. The compiler or data type checking tool may reason about concrete types as sufficient for reference cycle detection since all values created at runtime must be at least one concrete data type.

In some embodiments, the compiler or data type checking tool checks for potential reference cycles by building a graph of potential type containment relationships. Some nodes in the graph may correspond to data types defined in the programming language source code. Some nodes in the graph may correspond to worst-case assumptions about generic type parameters. The worst-case assumptions may take into account bounds on generic type parameters or bounds on data type definitions. One type of bound on a data type definition is referred to herein as a "may-not-reference" bound. Some edges in the graph may correspond to ways that one data type defined in the programming language source code may refer to another data type defined in the programming language source code. Graph elements (e.g., nodes and edges) may be associated with metadata derived from the early-ness, read-only-ness, or closed-ness of property and data type definitions. In some embodiments, a cycle in the graph with particular kinds of edges corresponds to a possible reference cycle allowed by a set of one or more data type definitions in the programming language source code.

The alert generated by the compiler or data type checking tool may include a human-readable description of possible reference cycles. For example, the description may say something like "A value of type Thing may refer to itself via its property otherThing. 'aThing.otherThing=aThing;' would create a reference cycle." Such a description may be derived from metadata associated with nodes or edges in a graph of potential type containment relationships. The description may include suggestions about how to correct the problem (e.g., how to avoid the potential reference cycle). In some embodiments, an external tool such as an integrated development environment uses the alert or a modified form of the alert (e.g., a more machine-readable form of the alert) to automatically change the programming language source code based on a suggestion selected by a programmer user.

In some embodiments, the compiler or data type checking tool ignores potential reference cycles that have been deemed safe by a human reviewer. Identifying reference cycles that have been deemed safe may be based on hints, annotations, or other metadata associated with data type definitions in the programming language source code. Identifying reference cycles that have been deemed safe may instead or also be based on determining that involved properties only being assigned inside "unsafe" fragments of the programming language source code that the compiler or data type checking tool exempts from data type checks so that human auditors can approve a data type definition for which it is necessary to allow reference cycles.

In some embodiments, a distributed object system keeps reference counts for objects needed by other computers or processes on the same computer and relies on acyclicity checks to avoid having to detect reference cycles between some types of objects. In this context, objects can reference objects that exist in other processes and when a process in the distributed system no longer needs an object it may send a message to the process in the system deemed to own the object. Separate reference counts may be maintained for the same object by multiple processes in the system to handle the case where one of the processes dies or fails, or to handle the case where one of the processes misbehaves such as, for example, by claiming it no longer needs two references when it had less than two references to begin with, possibly with the intent to cause that object to become unavailable to other processes.

DETAILED DESCRIPTION

In the following description, for the purposes of explanation, numerous specific details are set forth to provide a thorough understanding of the techniques. It will be apparent, however, that the techniques may be practiced without these specific details. In other instances, well-known structures and devices are shown in block diagram form in order to avoid unnecessarily obscuring the techniques.

Glossary

The following definitions are provided for illustrative purposes, not limitation, to aid in understanding of the disclosure of the techniques:

Client: A "client" may be defined as part of a computer system that delegates a task to a library.

Compiler: A "compiler" consumes an input suitable for both human and machine consumption and produces one or more outputs. Each output is a translation by the compiler of the input. For example, the input can be source code written in a source programming language. An output can be an executable form of the input source code. An output can also be a source code form of the input source code in a target programming language that is different from the source programming language.

Cross-Compiler: A "cross-compiler" is a compiler that produces two or more outputs from one input.

Deallocation: The term "deallocation" refers to the runtime operation in the context of an executing computer program of freeing up the memory space occupied by unnecessary objects for reuse.

Garbage Object: A "garbage object" is an object that can be safely deallocated but that has not yet been deallocated.

Graph: A "graph" is a mathematical structure used to model pairwise relations between entities. A graph in this context is typically made up of vertices (also called nodes or points) which are connected by edges (also called links or lines). A computer program can represent a graph in a variety of different ways including via node objects that refer to edge objects that refer to node objects. Other possible ways include via an adjacency matrix, an incidence matrix, or an adjacency list.

Library: A "library" may be defined as the expression of an algorithm or algorithms in an automatable form. An example of an automatable form may be programming language code or a compiled version thereof (e.g., as bytecode, binary-executable code, etc.). Typically, when executed as a process or processes, the library does not "own" the process(es) of which it executes as a part of. Instead, a library executes alongside or as part of a larger system that delegates specific kinds of algorithmic tasks to the library. For example, a microservice on a computer network may be viewed as a library. Microservices often exist for other network nodes to delete specific algorithmic tasks to.

Object: An "object" may be defined as a runtime entity that can respond to messages within a computer program. The entity typically occupies a region of computer memory. An object may respond to messages and organize the bits in the occupied memory region according to a data type definition. One example of an object is a runtime instance of a class definition according to an object-oriented programming language.

Reference: A "reference" is a runtime value that enables a computer program to access an object stored at a location in computer memory. Obtaining the object stored at the location using the reference is sometimes referred to as dereferencing. A "pointer" is one example of a reference.

Runtime: A "runtime" for a programming language encompasses computational mechanisms that support execution of computer programs written in that language. For example, a runtime for a programming language may encompass a virtual machine that understands the bytecode instructions to which that language's computer programs are compiled. The JAVA virtual machine (JVM) is but one example of such a runtime. A runtime may also provide implicit deallocation services such as garbage collection or cycle collection. However, not all runtimes provide implicit deallocation services. In addition, the term "runtime" is used herein refer to the time when a computer program is executed.

Target: A "target" may be defined as a mechanism used by a client to connect to a compiler output. A programming language can be a target; a programmer writes code to connect to a library that loads into the same memory space. A virtual machine (VM) can be a target; a programmer can write code that compiles to the kind of bytecode that the virtual machine runs and rely on the VM to link uses via the interface. Another program may be a client. Accordingly, inter-program mechanisms are targets; code may use inter-process communication (IPC), remote procedure calling (RPC), or RESTful network protocols to send a message to something running outside the client program's process such as, for example, a network service or a microservice, and recognize when an incoming message contains a response.

General Overview

Unresolved reference cycles in a computer program can lead to a buildup at runtime of garbage objects. Such buildup can cause catastrophic program failure. To illustrate, consider the PYTHON programming language. Older versions of the PYTHON runtime use reference counting to keep track of allocated memory. In particular, a runtime object in PYTHON has a reference count which indicates how many objects are referring to it. When the reference count reaches zero, the object is freed from memory. Reference counting can work well for most PYTHON programs to prevent a buildup of garbage objects. However, reference counting can fail when there are "reference" cycles. A reference cycle occurs when objects reference each other.

Consider the following simple PYTHON program that creates a list object, stores a reference to the list in an element of the list itself, and then deletes the list object.

00: l=[ ]
01: l.append(l)
02: del l

The statement at Line 00 creates a list and increments the reference count of the list to one. The statement at Line 01 adds a reference to the list to the list itself producing a reference cycle and incrementing the reference count of the list to two. The statement at Line 02 deletes the reference to the list by the variable 'l' and decrements the reference count of the list from two to one. Because of the reference cycle, the list is left with a reference count of one due the internally held self-reference created by the statement at Line 01. Consequently, the list will not be implicitly deallocated through reference counting only. This is undesirable because the list cannot be used after the statement at Line 02 and should be deallocated.

While intentionally creating reference cycles in a computer program is generally not considered to be good programming practice, sometimes it is difficult to avoid creating reference cycles and other times the programmer is not aware that a reference cycle will be created. For long running programs such as server programs, this can be problematic and possibly even catastrophic if the server program runs out of memory because reference counting was unable to deallocate unusable objects.

To address this shortcoming of reference counting, some versions of the PYTHON runtime use a garbage collector that finds reference cycles in an executing PYTHON program at runtime. Referencing counting is still used for deallocating other objects. Nonetheless, there can still be problems with object "finalizers." A "finalizer" is a set of one or more actions that need to happen when an object is deallocated. Finalizers are often used to release system resources like operating system file descriptors, which can be limited in number. An example of a finalizer in PYTHON is a "__del__" method of an object (e.g., an instance of a class that provides an implementation of the special PYTHON "__del__" method.)

With referencing counting, when an object's reference count goes to zero, the finalizer is called before the object is deallocated. However, with garbage collection, it becomes more difficult for programmers to reason about the behavior of finalizers at runtime, especially when there are reference cycles. For example, if two objects in a reference cycle both have finalizers, which finalizer should be called first? After calling one of the finalizers, the object cannot be freed as the other finalizer may still need to access it. Faced with this situation, some versions of the PYTHON runtime do not deallocate objects with finalizers where the objects create reference cycles. Instead, the objects are added to a global list of uncollectable garbage objects. A PYTHON program can be programmed to access the global list and explicitly free reference cycles in a way that makes sense for the particular application at hand. Of course, this presumes the programmer is aware that the reference cycles can be created in the first place. Even then, the programmer must take care to deallocate objects in the global list.

As clear from the foregoing PYTHON example, adding support for implicit deallocation to a runtime can be accompanied by complications. Adding garbage collection as in the PYTHON case was helped by the fact that the PYTHON runtime runs inside a C or C++ runtime. However, adding support to a C or C++ runtime that may embed other runtimes is not straightforward. For example, the various runtimes need to recognize each other's references as references and consistently agree on which runtime is responsible for performing deallocation.

In general, from the perspective of a programmer, there are at least two kinds of reference cycles: (1) intended reference cycles, and (2) unintended reference cycles. Recursive data types such as trees can be a source of unintended reference cycles. For example, lists of lists can avoid reference cycles if their use is programmed carefully. However, as evidenced by the PYTHON example above, it is possible in many programming languages to unintentionally create reference cycles that cannot be untangled at runtime by simple reference counting.

Techniques disclosed herein address these and other issues.

Computer-implemented techniques are provided for preventing garbage object accumulation on minimal runtimes. The techniques include checking whether source code written in a source programming language that does not require the programmer to explicitly program when deallocation happens can run within a runtime that provides little or no support for implicit deallocation. At the same time, the techniques ensure that objects in minimal runtimes are deallocated in a timely manner.

The techniques encompass generating a compile-time alert (e.g., an error or warning message) to the programmer of source code in the source programming language or halting compilation of the source code upon detecting a data type definition in the source code with the potential for reference cycles. The techniques are flexible enough to allow the programmer to define apparently cyclic, but actually acyclic, data types in the source code. The techniques are also flexible enough to allow the programmer to define recursive but not self-referential data types in the source code. With the techniques, the programmer is provided with an implicit deallocation experience while producing program fragments that interoperate with minimal runtimes that provide no or only minimal support for implicit deallocation (e.g., provide only reference counting).

These and other aspects of the techniques will become apparent from the following detailed description in combination with the accompanying drawings, illustrating, by way of example, the principles of the techniques.

Apparent Cycles without Actual Cycles

As indicated, a programmer may program source code in the source programming language with the intention to allow reference cycles. For example, the programmer may program the source code to define a recursive data type. A recursive data type is a data type that references its own data type definition.

For example, consider the following data type definitions in a possible source programming language:

```
00: closed type List<E>;
01: closed concrete type Cons<F> extends List<F> {
02:   initial: F;
03:   rest: List<F>;
04: }
05: closed concrete type Empty<G> extends List<G> { }
```

According to the above data type definitions, the initial property is defined as a generic data type and the rest property is defined as a List<F> type, which is the parent type of the Cons<F> type. As such, either or both the initial and rest property of a Cons<F> object can refer to the Cons<F> object itself. Hence, the Cons<F> data type is a recursive data type.

In the above data-type definitions, the closed keyword specifies that all of the data type's sub data types are known to the compiler, as opposed to an extensible data type where additional sub data types of the data type can be specified after the fact. In some implementations, closed data types are the default and thus the closed keyword need not be specified if a closed data type is desired.

As another example, consider the following data type definition of a binary tree in a possible source programming language:

```
00: closed type Tree<B>;
01: closed concrete type BinaryTree<F> extends Tree<F> {
02:   element: F;
03:   left: Tree<F>;
04:   right: Tree<F>;
05: }
06: closed concrete type Empty <G> extends Tree<G> { }
```

The above data type definitions define the generic data type BinaryTree<F> as a set of values. According to the above type definitions, either or both the left and right properties of a BinaryTree<F> object can contain values of the BinaryTree<F> type. Hence, the BinaryTree<F> data type is also a recursive data type.

As mentioned, instances of a recursive data type can develop into a reference cycle at runtime. FIG. 1 depicts an example cyclic collection of objects at runtime. For example, the collection of objects might represent a tree or graph data structure. The ovals represent runtime objects in computer memory and the directed edges represent references from one object to another. For example, object 1 refers to object 2 by reference d. There are numerous reference cycles in the example collection as depicted by the directed edges in different directions. For example, if the collection of data objects represents a tree data structure, reference u from object 6 and to object 7 might represent that object 7 is the first child node in the tree of object 6, in that case reference v might represent that object 7 is the last child node in the tree of object 6, and reference t might represent that object 7 is the parent node in the tree of object 6, etc.

Facade Approach

The techniques encompass a façade approach. According to the facade approach, instead of representing relationships between objects at runtime by a taxonomy of mutually referencing nodes and edges, the relationships between objects can be represented at runtime using the façade approach. With the façade approach, a collection of objects may appear to the executing program as cyclic (i.e., apparently cyclic), but its runtime implementation is actually acyclic. Because its runtime implementation is actually acyclic, implicit runtime deallocation support such as an automatic garbage collector or an automatic cycle collector is not needed. Instead, a simple referencing counting mechanism can be used to timely deallocate the objects.

A source-to-source compiler that translates source code in the source programming language to source code in a target programming language that does not support implicit object deallocation at runtime can generate the target source code to use the facade approach. By doing so, the target programming language runtime can timely deallocate objects without needing to support implicit runtime deallocation. In conjunction with the facade approach, the source programming language can provide the programmer with an implicit deallocation programming experience where the programmer need not be concerned about programming the source code in the source programming language to expressly allocate and deallocate objects. This experience is provided even if one or more of the target languages of the source-to-source compiler does not support implicit runtime deallocation. The programmer is also allowed to define recursive data types in the source programming language. Because of the apparently cyclic, but not actually cyclic, representation of the objects at runtime, reference cycles are not created at runtime.

The façade approach uses a larger taxonomy. In particular, the larger taxonomy includes:
  "data" objects which are instances of defined data types,
  "relationship" objects that collect the relationships between the data objects,
  "graph" objects that pair data objects and relationship objects, and
  "facade" objects that present the as-if-cyclic appearance and which refer to both a data object and a graph object.

According to the facade approach, a program at runtime accesses and modifies a collection of data objects that are programmed in the source programming language to allow reference cycles. For example, the collection of data objects may represent a data structure that is based on a recursive data type defined in the source programming language. For example, the data structure may be a list, tree, or graph data structure where the objects of the data structure are instances of recursive data types.

The facade approach provides through facade objects a runtime mechanism by which the collection of data objects can maintain acyclicity. It is through the facade objects that the collection of apparently cyclic data objects maintains its actual acyclicity despite its appearance to the program of being cyclic. Because acyclicity is maintained, runtime garbage collection or reference cycle detection is not needed to timely deallocate the collection of data objects.

In the taxonomy of the facade approach, a given facade object corresponds to at most one most one graph object and at most one data object. However, multiple facade objects may correspond to the same data object. A given graph object may correspond to one or more relationship objects and a given relationship object can correspond to one or more data objects. As such, a given graph object can correspond to one or more data objects by way of the one or more relationship objects to which the given graph object corresponds.

Figure 2:
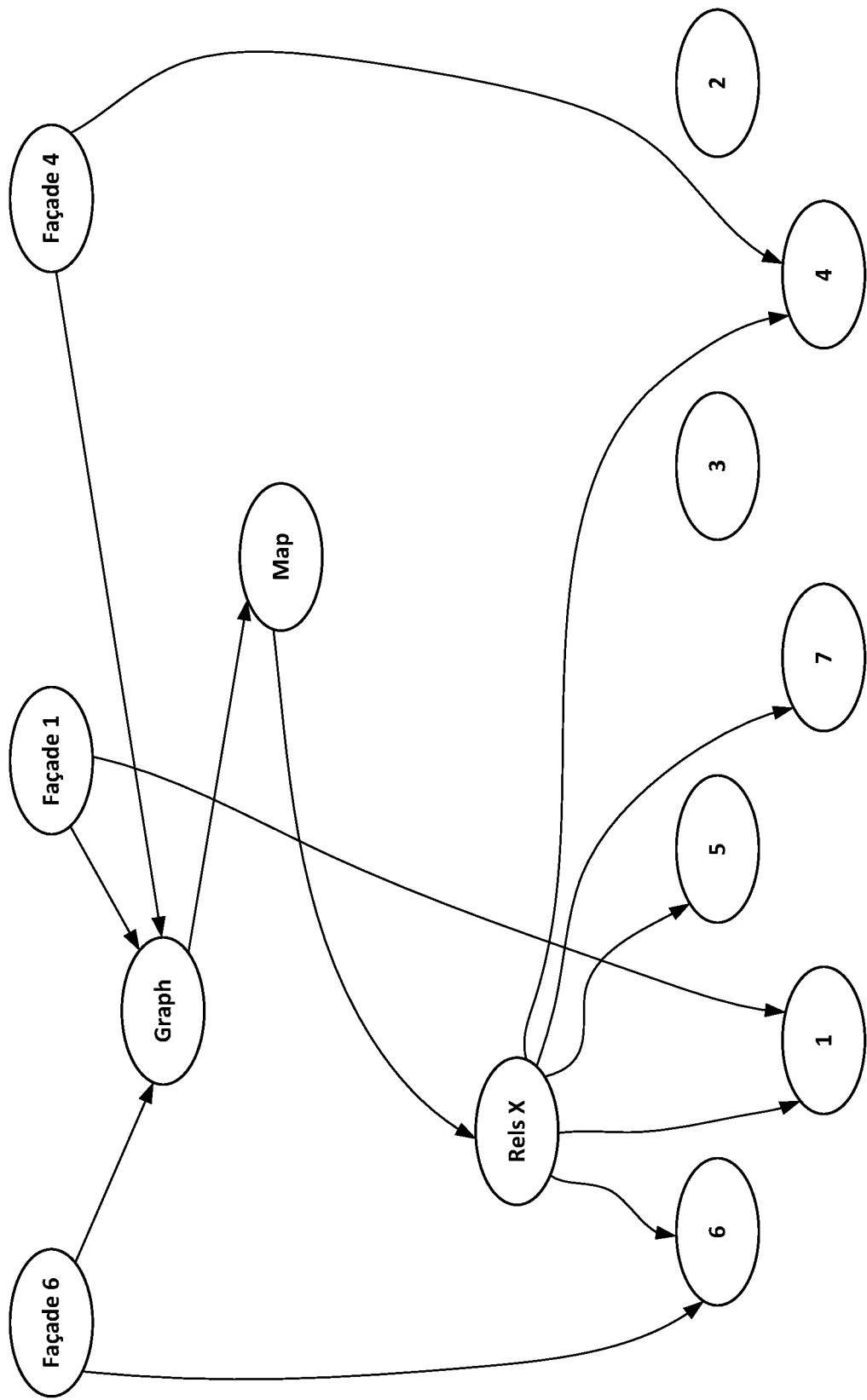
FIG. 2 illustrates a first example of using a façade approach to provide an apparently cyclic view of an actually acyclic data structure.

FIG. 2 depicts an example application of the façade approach to the example cyclic collection of objects depicted in FIG. 1. As can be seen in FIG. 2, the cyclic collection of objects is represented at runtime as an acyclic collection of objects. In this example, there are only facade objects for data objects 1, 4, and 6 and no facade objects for data objects 2, 3, 5, and 7. A different set of facade objects is possible including a set with only one facade object and a set that includes multiple facade objects for the same underlying data object. Further, different sets of facade objects may be created for the collection of data objects at different times over the course of the running program depending on the access and modification patterns of the program with respect to the collection of data objects.

At runtime, references to a data object in the collection are made via a facade object for the data object. For example, referring to FIG. 2, if a program uses façade object 6 to request data object 1 at the other end of the reference f, façade object 1 is provided to the program instead of providing data object 1 or a reference to data object 1. Façade object 1 may be provided by a computed property abstraction of façade object 6, for example.

To determine at runtime which data object is at the other end of a reference, a façade object may use a graph object. The graph object may encompass a map object. The map object pairs data objects to relationship objects. For example, the map object of FIG. 2 may map data object 6 and data object 1 to relationship object X. In particular, when the program uses facade object 6 for data object 6 to reference the data object at the other end of reference f, facade object 6 in turn uses the graph object and the map object to determine which relationship object referenced by the graph object collects the relationship between data object 6 and data object 1 via reference f. Facade object 6 may then create facade object 1. In doing so, the facade object 1 is created or configured with a reference to data object 1 that facade object 6 obtains via relationship object X. Facade object 1 is also created or configured with a reference to the graph object. The is shown in FIG. 2. Facade object 1 instead of data object 1 is then returned by facade object 6 to the calling program to maintain the apparent cyclicity but actual acyclicity of the collection of data objects.

The map object may be constructed in various ways. For example, the map object may encompass a two-dimensional array where each element of the array corresponds to a pair of data objects and indicates the relationship object that groups all of the relationships between the pair of data objects. For example, if M is the two-dimensional array, then M[x][y] references the relationship object that groups all relationships between data object x and data object y. As an alternative for the two-dimensional array, M[x][y] may reference the relationship object that groups all relationships from data object x to data object y (or from data object y to data object x). Alternatively, the map object may encompass a single-dimensional array where each array element corresponds to a data object and the relationship object that groups all relationships from that data object to other data objects. For example, M[x] may reference the relationship object that groups all relationships from data object x to other data objects.

Figure 3:
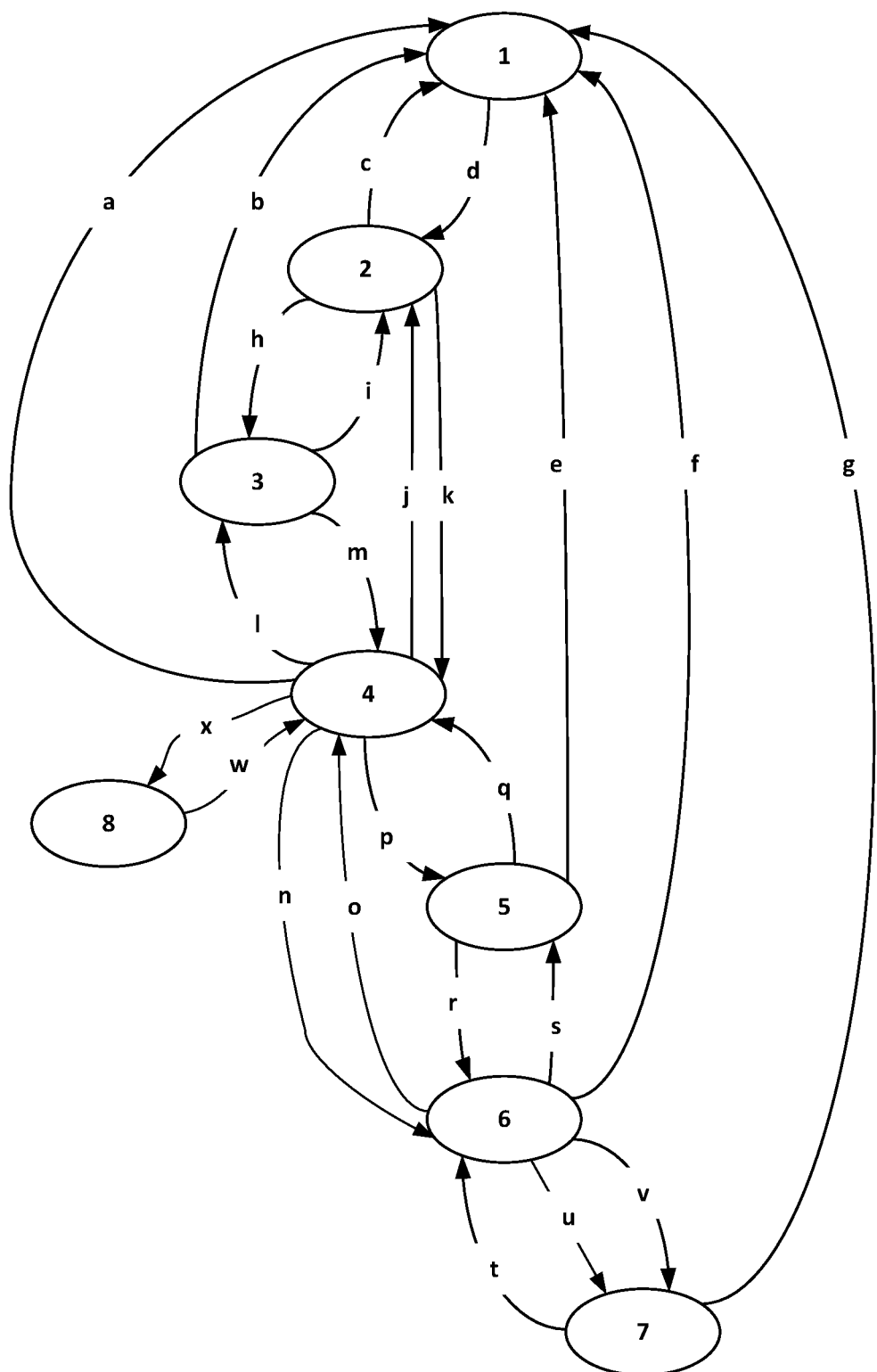
FIG. 3 depicts a second example of a cyclic data structure.
Figure 4:
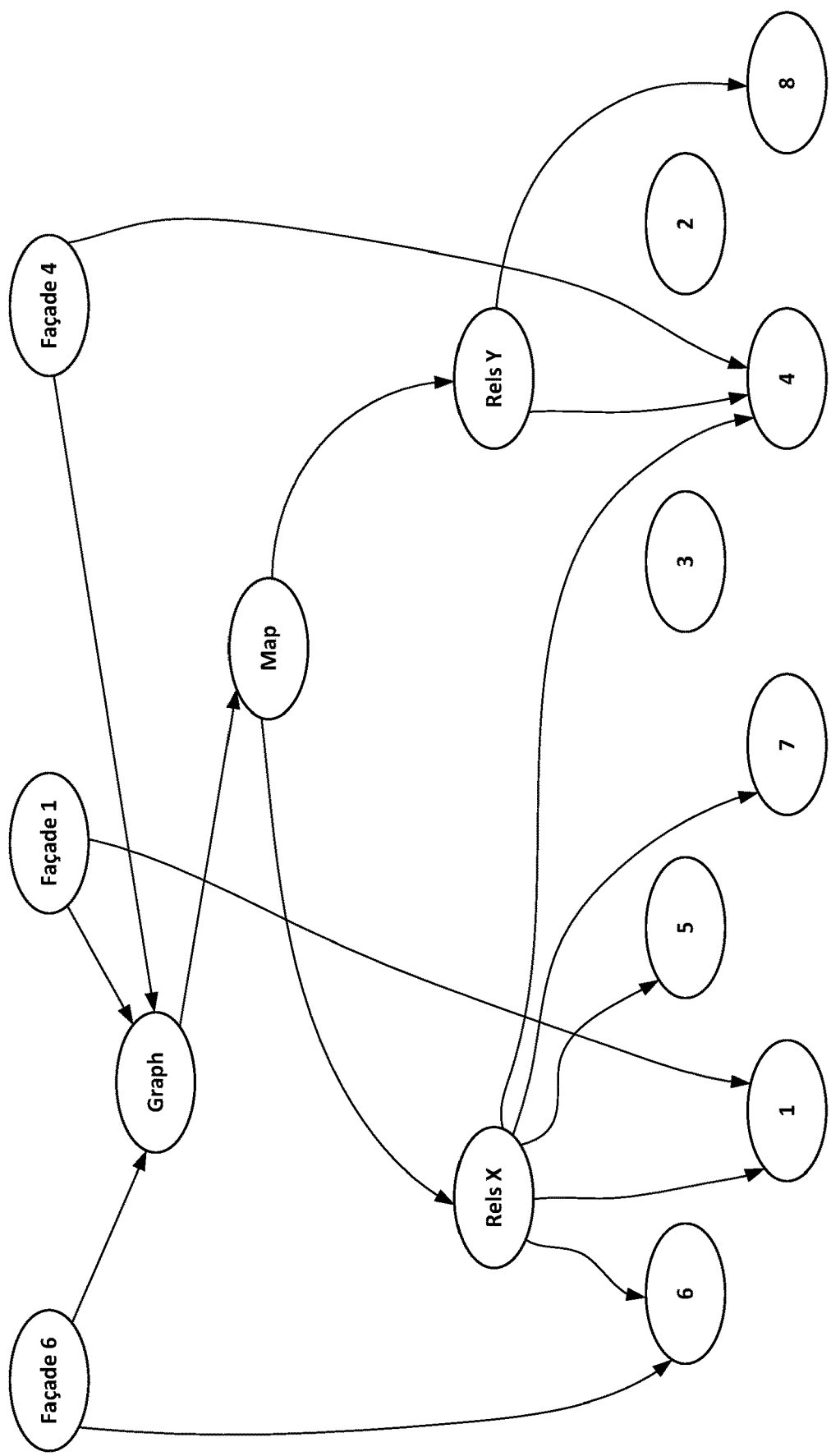
FIG. 4 illustrates a second example of using a façade approach to provide an apparently cyclic view of an actually acyclic data structure.

When a data object is added to the collection at runtime, it may be connected to a graph object. For example, FIG. 3 depicts the cyclic collection of data objects of FIG. 1 but with the addition of data object 8 that has references w and x with data object 4. References w and x create a reference cycle in the cyclic collection of objects of FIG. 3. FIG. 4 depicts the apparently cyclic but actual acyclic representation of the collection of objects with the addition of data object 8. In particular, the map object of the graph object may be updated to map data object 8 and data object 4 to relationship object Y. Relationship object Y collects the w and x relationships between data object 8 and data object 4.

Figure 5A:
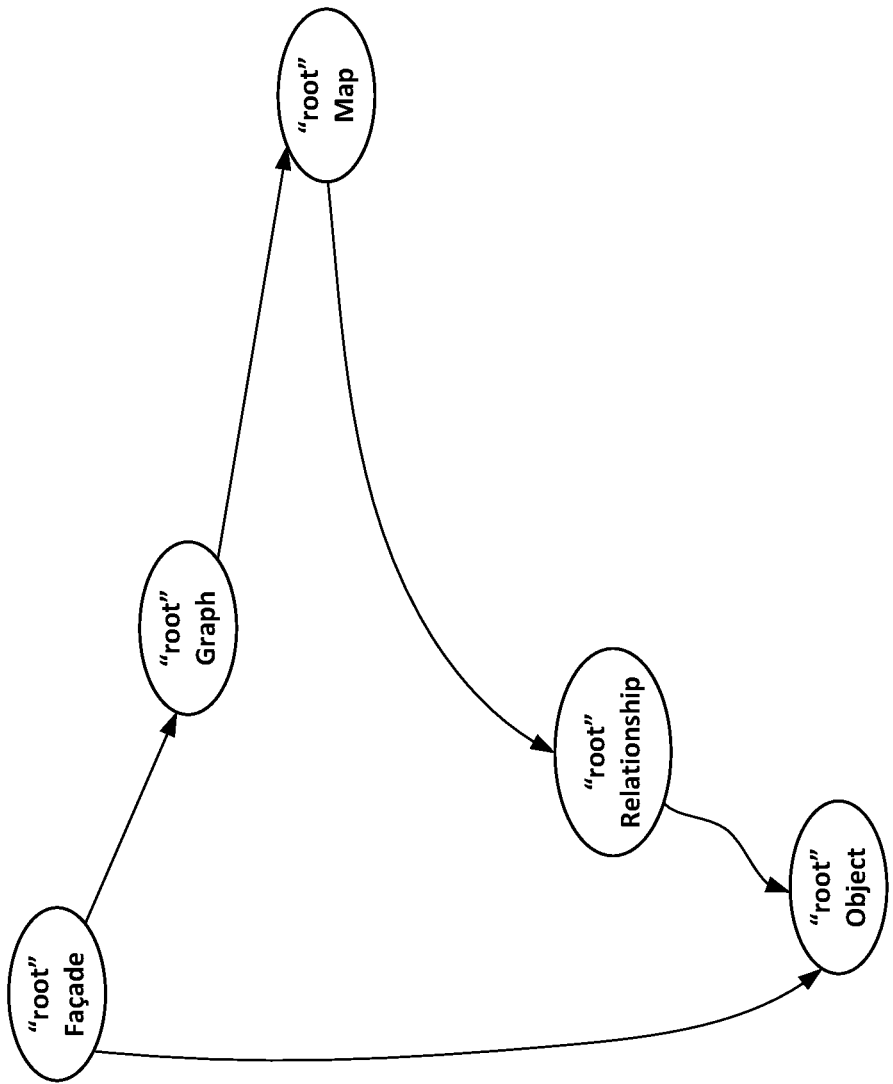
FIG. 5A, FIG. 5B, FIG. 5C, FIG. 5D, FIG. 5E, FIG. 5F together depict an example of using the facade approach to provide an apparently cyclic view of an actually acyclic data structure.

Under the facade approach, a data object can have relationships with another data object via a graph object. This has implications on how data objects are added to an existing data structure. For example, consider the following source code in a possible source programming language:

00: let root=BinaryTree("root", Empty, Empty);
01: let left=BinaryTree("left", Empty, Empty);
02: root.left=left;

Line 00 creates a "root" data object as an instance of the BinaryTree<F> recursive data type discussed above. FIG. 5A depicts an acyclic runtime representation of the "root" data object created at Line 00 above, according to the facade approach. Instead of referencing the "root" data object directly, the variable "root" is a facade object that references the "root" data object and a "root" graph object. At this point in execution, the "left" object instance at Line 01 has not been created. Thus, the "root" relationship object does not group any relationships between the "root" data object and the "left" object.

Figure 5B:
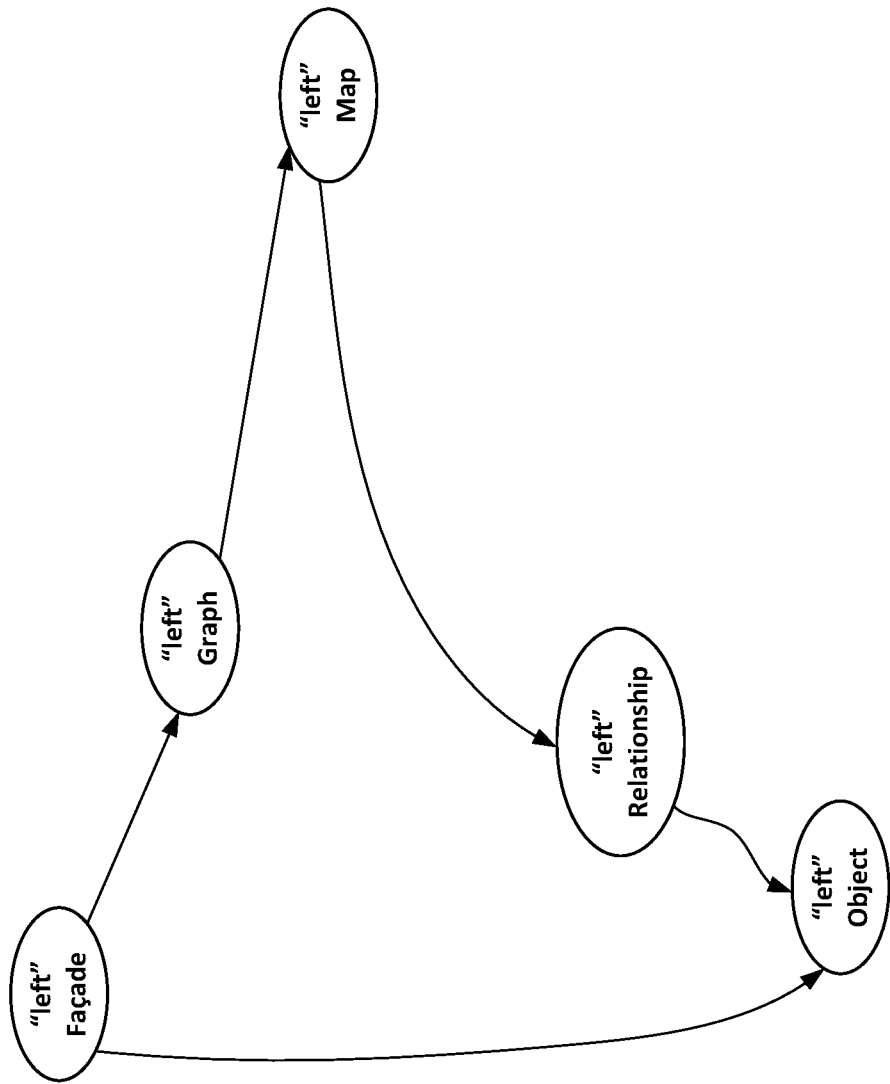

Line 01 creates the "left" data object as an instance of the BinaryTree<F> recursive data type discussed above. FIG. 5B depicts an acyclic runtime representation of the "left" data object created at Line 01 above, according to the facade approach. Instead of referencing the "left" data object directly, the variable "left" is a facade object that references the "left" data object and a "left" graph object, which may be a different graph object than the "root" graph object that the "root" facade object for the "root" data object references as depicted in FIG. 5A. At this point in execution, there is still no relationship between the "root" data object and the "left" data object. As such, the "left" relationship object that refers to the "left" data object also does not group any relationships between the "root" object and the "left" object. The "left relationship object may be a different relationship object than the "root" relationship object that refers to the "root" data object as depicted in FIG. 5A.

Line 02 sets the left property of the "root" object to reference the "left" data object. In the absence of the facade approach, the left property of the "root" data object might refer directly to the "left" data object at runtime. However, with the facade approach, such direct reference is prevented when the source code in the source programming language is compiled to source code in a target programming language that does not support implicit runtime deallocation. Specifically, the source code in the target language is compiled to implement the facade approach at runtime such that when the target language source code is compiled into an executable and executed the direct reference is prevented.

Figure 5C:
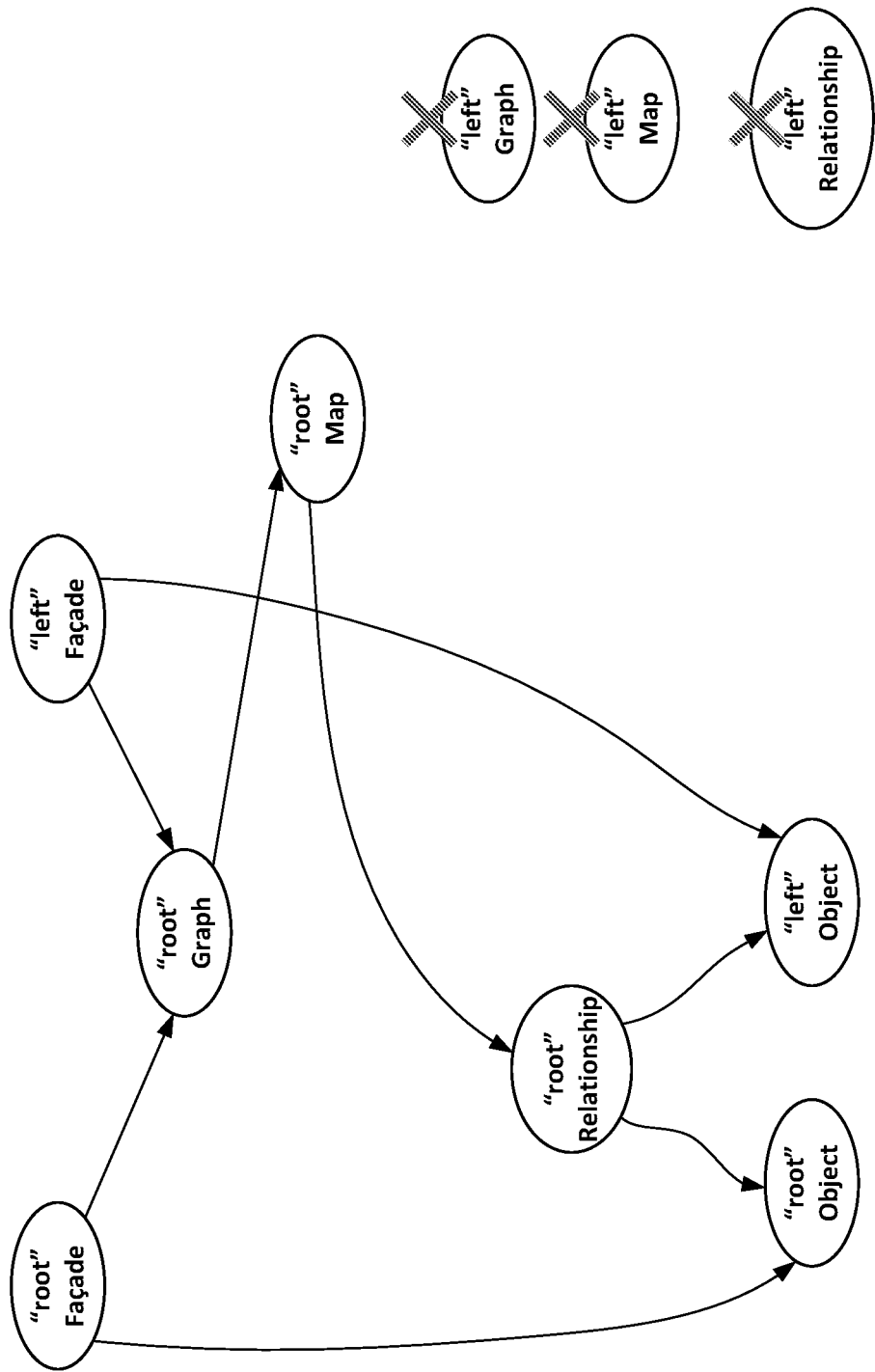

FIG. 5C depicts an acyclic runtime representation of the "root" and "left" data objects after the left property of the "root" data object is assigned to refer to the "left" data object, according to the facade approach. The root and left facade objects now share the same graph object. Specifically, the "left" graph object referred to by the "left" facade object (FIG. 5B) has been imported into the "root" graph object referred to by the "root" facade object (FIG. 5A). In doing so, the "left" facade object is updated to reference the "root" graph object and to no longer reference the "left" graph object. The "root" relationship object referred to by the "root" graph object is updated to refer to the "left" data object and the "left" relationship object in the left graph is disconnected from the "left" data object. The "left" graph object of the left graph may now be deallocated as its reference count is zero. Once the "left" graph object is deallocated, the "left" map object and the "left" relationship object of the "left" graph object may be deallocated, as their reference counts should be zero after the "left" graph object is deallocated. The "root" map object of the "root" graph object is updated to specify that the "root" data object has a relationship with the left "data object" and that relationship is grouped by the "root" relationship object.

Figure 5D:
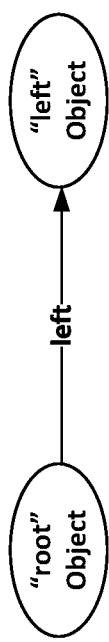

The acyclic representation of FIG. 5C represents at runtime the concept that the left property of the "root" data object directly references the "left" data object as illustrated in FIG. 5D.

Figure 5E:
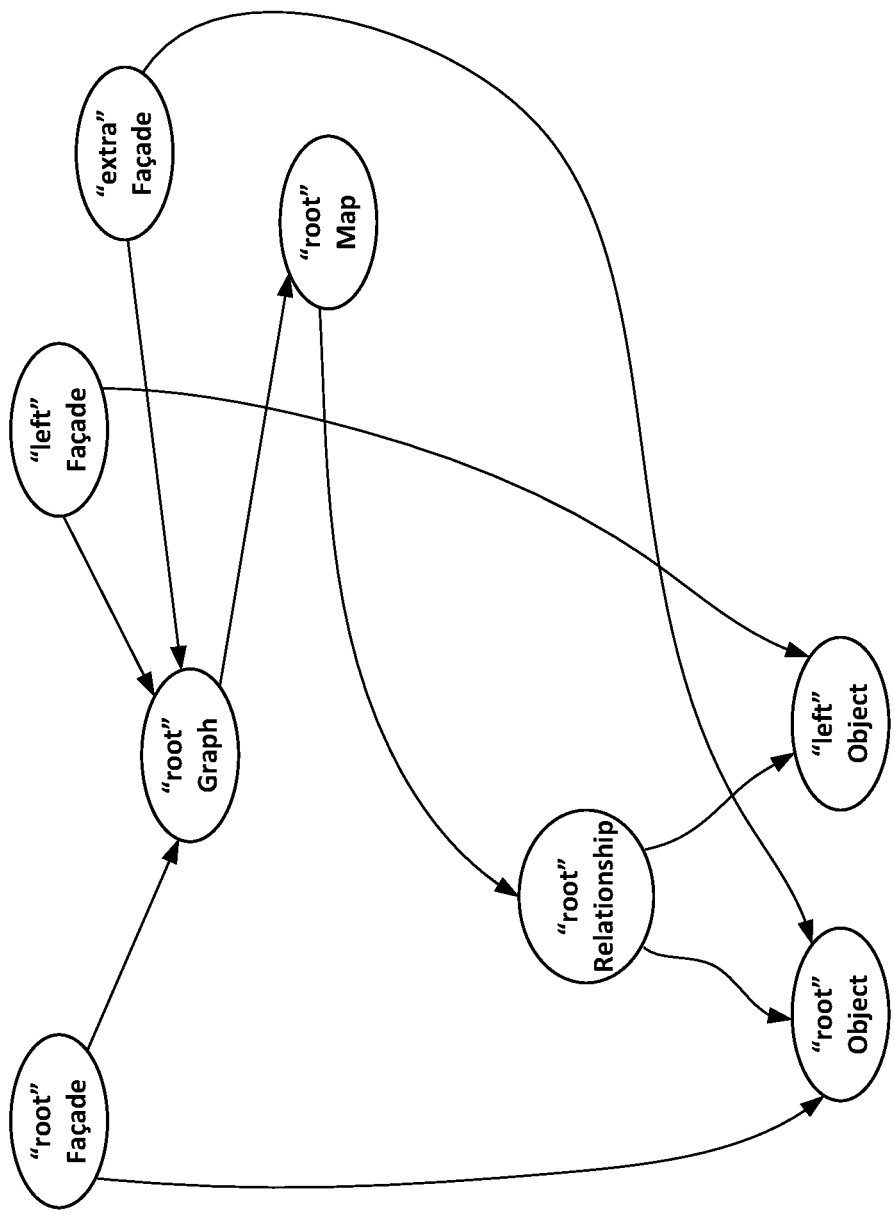

Now consider the following source code in the possible source programming language in addition to the source code above:

03: left.right=root;
04: let extra=root;

In the absence of the facade approach, the additional source code at Line 03 above will create a reference cycle at runtime between the "root" data object and the "left" data object. However, with the facade approach, the reference cycle can be avoided. This is shown in FIG. 5E which depicts an acyclic runtime representation of the "root" and "left" data objects after the right property of the "left" data object is assigned to refer to the "root" data object through facade objects as in Line 03 above, according to the facade approach. The "root" and "left" data objects still share the "root" relationship object that groups both (1) the relationship between the "root" and "left" data objects via the left property of the "root" data object and (2) the relationship between the "root" and "left" data objects created via the right property of the "left" data object. The variable named "extra" is a facade object that refers to the "root" graph object and the "root" data object.

Figure 5F:
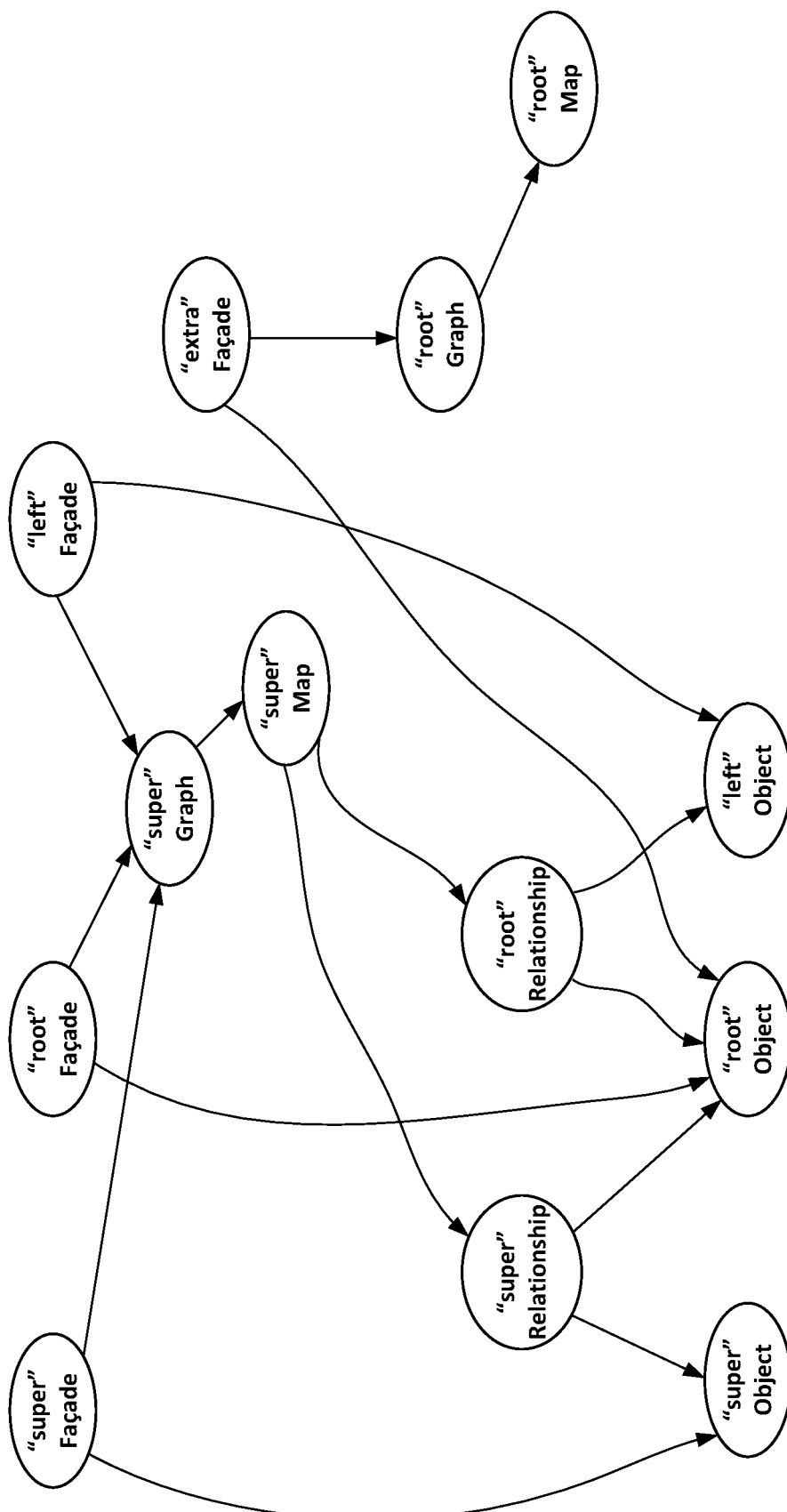

Now consider the following source code in the possible source programming language in addition to the source code above:

05: let super=BinaryTree("root", Empty, Empty);
06: super.left=root;

Line 05 creates a "super" data object as an instance of the BinaryTree<F> recursive data type discussed above. Line 06 sets the left property of the "super" data object to refer to the "root" data object created at Line 00 above. Under the facade approach, Line 06 may result at runtime, for a target language that does not support implicit runtime deallocation, the "root" graph object being imported into the "super" graph object. This importing is depicted in FIG. 5F which illustrates an acyclic representation of the "super," "root," and "left" data objects after the import, according to the facade approach. The "root" and "left" facade objects have been updated to refer to the "super" graph object. The "super" graph object and the "super" map object are updated to map the relationship between the "root" data object and the "left" data object via the left property of the "root" data object (Line 02 above) to the "root" relationship object. The "super" graph object and the "super" map object are also updated to map the relationship between the "super" object and "root" data object via the left property of the "super" data object (Line 06 above) to the "super" relationship object. Note that acyclicity is maintained even though Line 03 is programmed to create a reference cycle in the absence of the facade approach.

It should be noted that the "extra" facade object assigned to refer to the "root" data object in Line 04 above may still refer to the "root" graph object after the graph import caused by Line 06 above. However, the "root" graph object no longer refers to the "root" relationship object because of the graph import. In other words, the "extra" facade object has been "abandoned" by the graph import caused by Line 06 above. This abandonment is depicted in FIG. 5F. As can be seen, the "root" map object is no longer connected to the "root" relationship object. Thus, after Line 06 above, the programmer of the source code in the source programming language may need to take care not to attempt to use the "extra" facade object to dereference a relationship that the "root" data object has with another object. For example, consider the following additional source code:

07: A=root.left;
08: B=extra.left;

At runtime, after the import depicted in FIG. 5F, the result would be that the variable A is a facade object that refers to the "left" data object because of the assignment of Line 02 above. However, the statement at Line 08 would generate a runtime error or fault because the "extra" facade object was abandoned by the graph import depicted in FIG. 5F. Careful programming in the source programming language can avoid facade objects abandoned by graph imports. For example, creation of the extra variable at Line 04 might be omitted and the already created "root" facade object used instead.

Different façade objects referring to the same underlying data object and the same underlying graph object cannot properly be compared for equality based on a comparison of the memory addresses of the facade objects. This is because the facade objects are stored at different memory addresses. However, a facade object is semantically equal to another facade object if both facade objects refer to the same underlying data object and the same underlying graph object. According to the facade approach, the equality operator in a target programming language (e.g., C or C++) can be overridden such that when two façade objects are compared for equality, the operator indicates they are equal if they refer to the same underlying data object and the same underlying graph object, and unequal if they refer to a different data object or a different graph object.

Checking for Possible Cycles in Data Type Definitions

As mentioned, if a collection of data objects never contains a reference cycle at runtime, then reference counting is sufficient for timely deallocation of the data objects. More sophisticated deallocation mechanisms such as garbage collection or cycle detection are not needed.

At runtime, the ways in which data objects come to be and the ways in which they change are governed by their data type definitions in the source code of the source programming language. The source programming language can place restrictions on data type definitions in the source that are sufficient to prevent reference cycles from coming to be at runtime.

For example, consider the following data type definition of a "Cons" list in a possible source programming language. The Cons<F> data type is a recursive data type which is either empty or has a head element and a tail which is another list containing the remaining element:

```
00: closed type List<E>;
01: closed concrete type Cons<F> extends List<F> {
02:     head: F;
03:     tail: List<F>;
04: }
05: closed concrete type Empty<G> extends List<G> { }
```

The above data type definition is susceptible to reference cycles at runtime. For example, one could create an "ouroboros" list by creating a Cons<F> data object that is configured to point its tail at itself as in the following example:

06: let list=Cons(0, Empty);
07: list.tail=list;

According to some of the techniques, a data type definition in source code in the source programming language that is susceptible to a reference cycle at runtime is detected at compile time of the source code. The compiler can then emit an alert to the programmer or halt compilation of the source code. The alert can be a warning message or error message presented in a user interface or output to a file, for example. Instead, a compiler detecting a potential reference cycle in the source code and generating an alert, a dedicated type checking tool or other source code management tool may perform the detecting and alerting.

Generally, the detection of a potential reference cycle in a data type definition involves the source programming language compiler creating a data type definition graph with a node for each data type involved and then adding an edge for each property to the node representing its data type. For generic data types such as the Cons<F> type above, the compiler contextualizes the data type parameters. The contextualization is accomplished by creating a graph for each concrete data type definition, as opposed to an abstract data type definition. A concrete data type definition can be used at runtime to instantiate data objects of the data type, while an abstract data type definition only exists to support concrete data types derived therefrom. With a graph per-concrete data type definition, the compiler can translate data type parameters into the context of those defined on the concrete data type definition, thereby allowing the programmer of the source code in the source programming language to define and safely use nested data structures such as, for example, a list of lists. In addition, for each data type parameter, the compiler creates a "limit node" to represent worst-cases about the data types that the data type parameter might bind to.

Figure 6A:
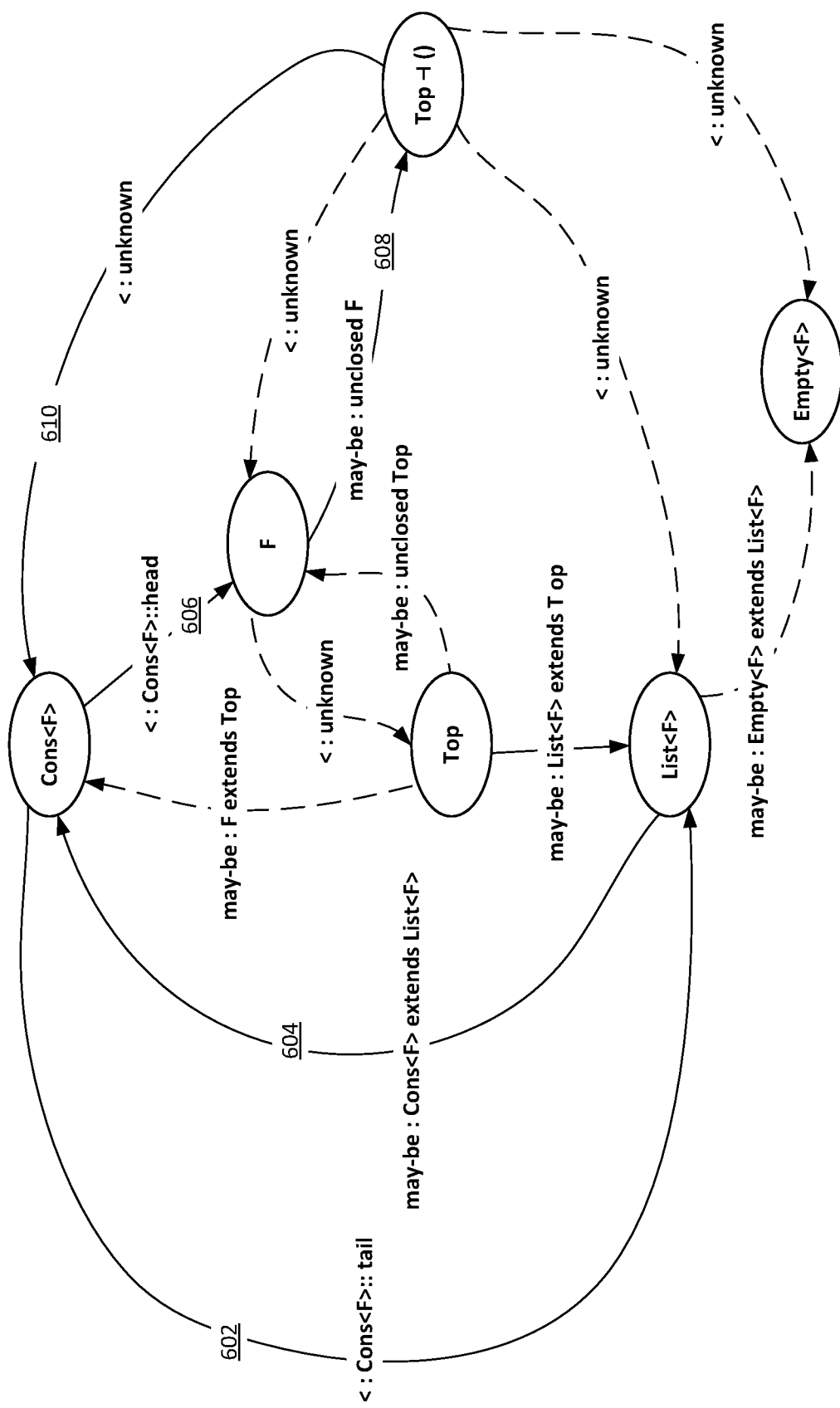
FIG. 6A, FIG. 6B, FIG. 6C each depict an example of a data type definition graph.

FIG. 6A is an example data type definition graph for the concrete and generic data type Cons<F> as defined above. The solid edge lines in the graph represent edges that may be involved in a reference cycle at runtime. The graph depicts two ways that reference cycles could arise at runtime.

In the first way, edge 602 represents that a data object of type Cons<F> can point, via its tail property to a data object of type List<F>. Edge 604 represents that a data object of type List<F> may also be a data object of type Cons<F>.

In the second way, if the generic data type F were instantiated with a very general data type like Top (which represents a hypothetical super data type that contains all data objects), then a data object of type Cons<F> may point via its head property to a data object of type F which may be some unknown data type that has its own property reference to a data object of type Cons<F>. The second way is represented by edges 606, 608, and 610 in FIG. 6A.

Reference cycles of the first data type can be solved by allowing a data type definition to encompass two extra pieces of information. This information can be manually entered by a programmer of the source code in the source programming language, inferred based on a static analysis of the source code, or automatically added to the source code because they are required by an automated or semi-automated tool such as, for example, an automatic or semi-automatic data type checking tool.

If a property of a data object can only point at runtime to a data object that is older than the data object that contains the property, then the property is not sufficient for a reference cycle. Accordingly, if it can be determined by the compiler that the property's initial value will be older than the data object that contains the property and that the property cannot change from its initial value (e.g., is read-only), then the property is not sufficient for a reference cycle.

According to the techniques, two meta-properties may be implicitly (e.g., by default) or explicitly (e.g., by a programmer) defined on a property of a data object in the data type definition of the data object:

read only—A "read only" property is a property of a data object that cannot change from its initially assigned value.

early—An "early" property is a property of a data object who's initially assigned value is determined before any reference to the data object containing the property is used as a value, instead of merely being used as a means to initialize a property of the data object. This latter qualification avoids corner-cases in constructors.

With the above two meta-properties, the above example data type definitions can be modified with the following read-only and early hints, as in the following example:

```
00: closed type List<E>;
01: closed concrete type Cons<F> extends List<F> {
02:   head: F;
03:   readonly early tail: List<F>;
04: }
05: closed concrete type Empty<G> extends List<G> { }
```

There are various ways in which the compiler can determine at compile time whether a property of a data type definition is read-only. No particular way is required. One way is based on a keyword hint explicitly programmed by the programmer in the property definition. The keyword hint might be "const," "final," "readonly," or the like. Another way may be based on the absence of a keyword hint with the opposite meaning such as, for example, the absence of a "mutable" or "writeable" keyword hint in the property definition. Yet another way is for the compiler to conduct a static analysis of the source code to determine whether any of the source code that could set a property to a value after its initial value is assigned does in fact do so. If not, then the compiler can infer that the property is read-only. The static analysis can be triggered by an explicit keyword hint (e.g., "read-only") in the property definition.

The compiler can also force a property to be read-only by inserting extra instructions at compile time that prevent the property from being assigned a value at runtime after the property has been initialized. In addition, or alternatively, the extra instructions may log (e.g., in a runtime diagnostic log or runtime profiler log) any runtime attempts to assign a value to the property after the property has been initialized.

Likewise, there are various ways in which the compiler can determine at compile time whether a property is early. No particular way is required. One way is based on the presence or absence of a keyword hint in the property definition. Another way is for the compiler to statically analyze the source code to determine if the property is initialized before any reference to the containing data object as a value. The static analysis can be triggered by an explicit keyword hint (e.g., "early") in the property definition.

The compiler can also force a property to be early by inserting extra instructions at compile time that prevent the property from being initialized at runtime after a reference to the data object containing the property is used as a value. In addition, or alternatively, the extra instructions may log (e.g., in a runtime diagnostic log or runtime profiler log) any attempts at runtime to initialize the property at runtime after a reference to the data object containing the property is used as a value.

There are also various ways in which the compiler can determine at compile time whether a data type is closed. A closed data type is a data type for which any and all sub data types are known to the compiler at compile time. The compiler can determine that a data type is closed based on explicit keywords hints in the data type definition such as "final," "closed," "sealed," or the like, or based on explicit keywords hints in the data type definition with the opposite meaning such as "open" or the like. Closed-ness may also be inferred by the compiler as part of a static analysis of the source code based on context. For example, if access to a data type definition is restricted by information hiding mechanisms to some modules or packages and there exists no definitions of sub data types of the data type in those modules or packages, then the compiler can infer that the data type is closed.

There are also various ways in which a compiler can determine at compile time whether a data type is concrete. A concrete data type is a data type that can exist as a data object of that type that is not an instance of a sub data type of the data type. A concrete data type is in contrast with an abstract data type that is not sufficient to define a data object but from which concrete sub data types may be derived. The compiler can determine that a data type is concrete based on the existence of an explicit keyword hint in the data type definition such as "concrete," or based on the existence of an explicit keyword hint in the data type definition with the opposite meaning such as "abstract." The compiler may infer concreteness of a data type through static analysis of the source code such as the use in the source code the data type to construct data objects of the data type, or by the absence of definitional elements in the data type definition for the data type in the source code that would prevent construction of a data object of the data type. Since all data objects must be a concrete data type, it is sufficient to type check only concrete data types for the potential to create reference cycles.

Figure 6B:
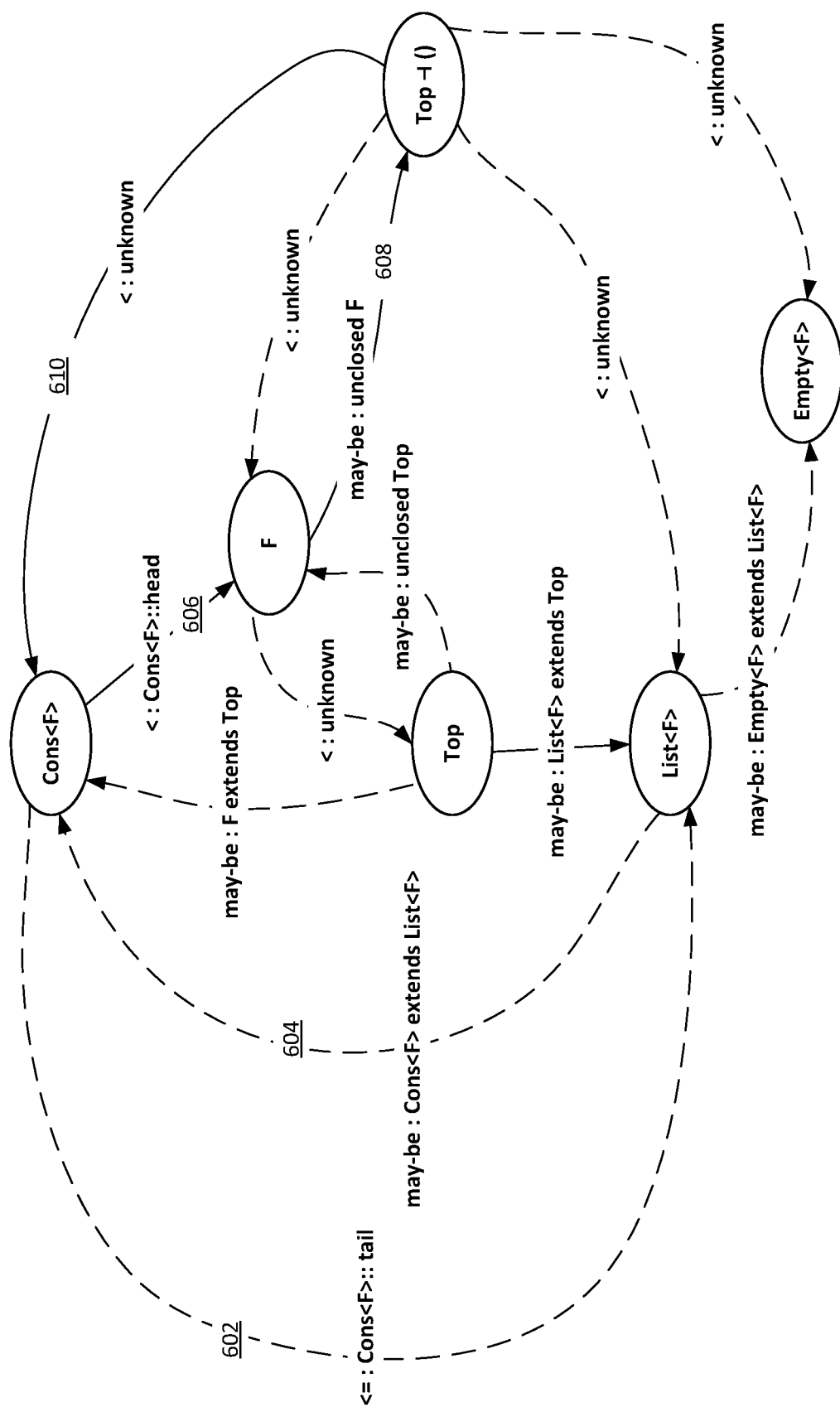

FIG. 6B is an example data type definition graph of the above example data type definition that uses the read-only and early hints. As can be seen, edges 602 and 604 are now broken to reflect that the corresponding reference cannot be involved in the creation of a reference cycle at runtime. In addition, the edge 602 for the tail property now has a less than or equal to relationship ('<=') instead of strictly less than relationships ('<'). Semantically, if an edge in a cycle in a data type definition graph has the less than or equal to relationship ('<='), then there is a known ordering that makes the part of the data type definition represented by the edge insufficient for a reference cycle at runtime. One type of known ordering is the read-only early relationship. For example, because of the read only and early restriction on the tail property, the potential reference cycle of edges 602 and 604 in FIG. 6A is no longer a potential reference cycle as represented in FIG. 6B. It will be recognized that there is no contradiction in asserting that a data type is less than or equal to itself.

However, there is still a potential reference cycle represented by edges 606, 608, and 610 in FIG. 6B. In particular, even with the read-only and early hints on the tail property, it is still the case that the head property of a Cons<F> data object could refer to a data object of an unknown type F which in turn could point back to the Cons<F> data object, thereby creating a reference cycle. This would be so even if the head property were read only and early because the head property could be initialized to a data object of an unknown type F which in turn refers to the Cons<F> data object.

In preventing the type of reference cycle represented by edges 606, 608, and 610 in FIG. 6B, it is desirable to allow a data object of a particular data type to refer to another data object of the same particular data type so long as the reference is not to itself. For example, a list of lists that do not refer to themselves should be allowed. Further, a data object containing primitive data types should be allowed. For example, a list of strings or numbers should be allowed.

To address problems like where a data object's property is a generic data type which could be any data type, an additional limitation expressed in source code in the source programming language may be used. For example, consider the following data type definition of a "Cons" list:

```
00: closed type List<E ⊣ Cons<E>>;
01: closed concrete type Cons<F ⊣ Cons<F>> extends List<F> {
02:   head: F;
03:   readonly early tail: List<F>;
04: }
05: closed concrete type Empty<G ⊣ Cons<G>> extends List<G> { }
```

In the above example, the notation A⊣B means than an A type data object must not directly reference at runtime a B type data object or directly reference any data object that directly references a B type data object. The techniques adhere to this notation when deciding whether a List<Number> is valid, for example. The notation may be written as dash bar and the symbol may appear in source in the source programming language as ('⊣') or ('-|') depending on the font ligatures are used in the source code editor. Other text-based notations may be used to express the A may-not-point-to B limitation and the inventions is not limited to the dash bar notation.

According to the techniques, the result of the above data type definition is that the data type definition of Cons<F> is generic, recursive, and, importantly, reference cycle free.

Figure 6C:
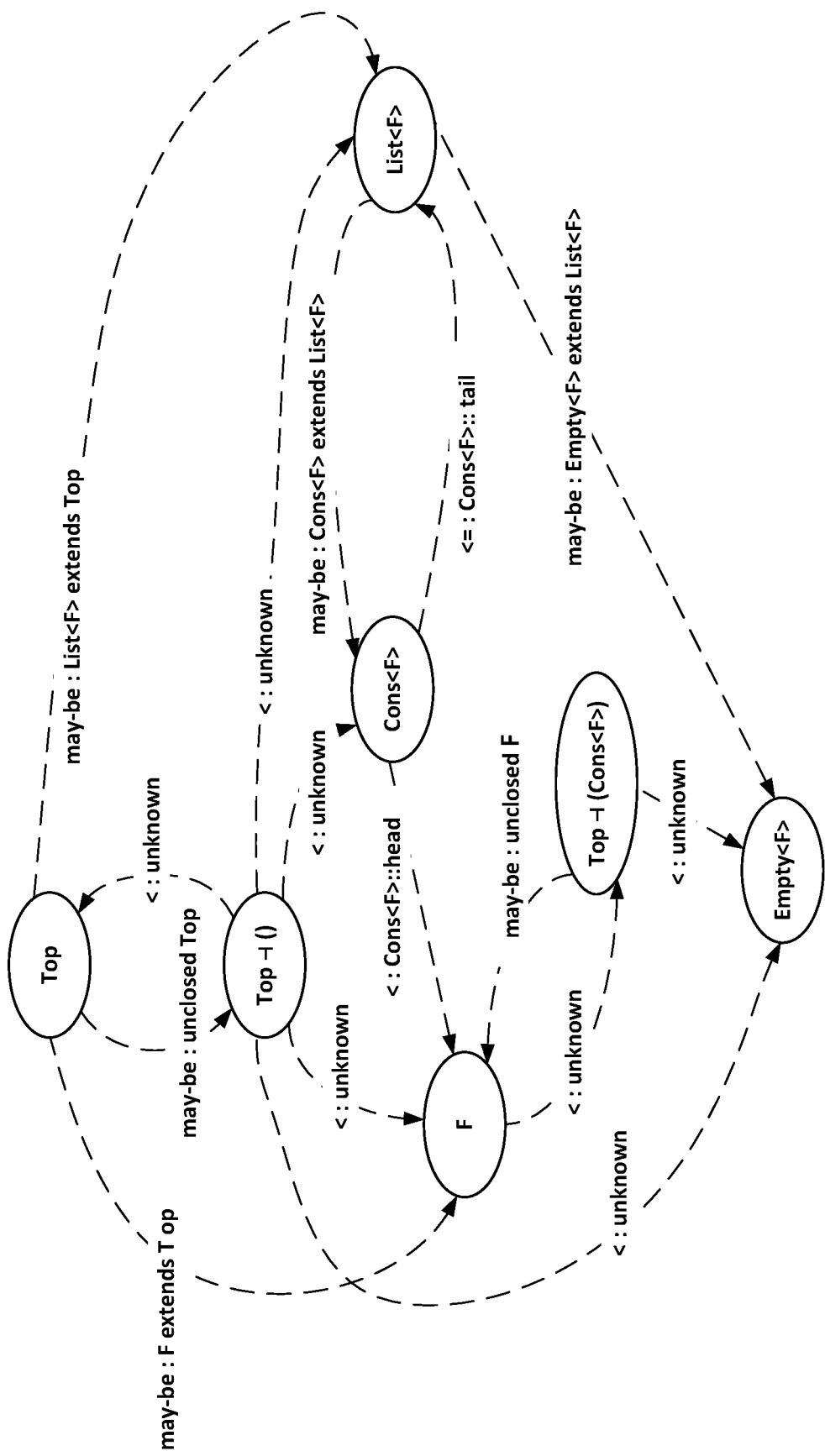

FIG. 6C is an example data type definition graph of the above example data type definition that uses the read-only and early hints and the additional limitation. As can be seen, the data type definition has no potential reference cycle involving a '<' edge from Cons<F> back to Cons<F> starting with a reference from Cons<F>. A difference between the data type definition graph of FIG. 6B and the data type definition graph of FIG. 6C is that a F data object may be a "Top⇥(Cons<F>)" instead of a "Top⇥( )." With that limitation, there are no "may-be" connections to Top (i.e., the super-data type of everything) or List<F> or Cons<F>. However, Empty<F>, which refers to nothing, is allowed.

Example Data Type Checking Process

FIG. 7A, FIG. 7B, FIG. 7C, FIG. 7D, FIG. 7E, FIG. 7F, FIG. 7G, FIG. 7H encompass flowcharts of an example data type checking process. The data type checking process may be performed by a compiler of source code in the source programming language where the source code contains a concrete data type definition. The compiler may perform the data type checking process to determine whether the concrete data type definition allows for reference cycles at runtime. Upon detecting a concrete data type definition that allows for reference cycles at runtime, the compiler can halt the compilation process or output an alert. The alert can be output to a user interface (e.g., graphical or command line), to a file, to a database, or to another suitable data container for the alert. The alert can be an error or warning message indicating that there was an issue with the concrete type definition identified by the type checking process. For example, the message may identify the concrete data type definition that allows for reference cycles at runtime. For example, identification may encompass the name of a source code file and a line number in the source code file or a set or span of line numbers in the source code file where the concrete data type definition is defined, along with an explanation of the error or warning. For example, the explanation might state something like "concrete type Cons<F> defined in mysource.src at line 52 allows for reference cycles."

The compiler performing the type checking process may be a source-to-source compiler that compiles the source code in the source programming language to one or more target programming languages where the one or more target programming languages include at least one target programming language with minimal runtime support for deallocation (e.g., no implicit deallocation services). For example, the target programming language might be any of C, C++, OBJECTIVE-C, or RUST. Alternatively, the compiler of source code may process the source code for quality control purposes without additionally translating an intermediate representation of the source code to a target programming language. As yet another alternative, the compiler can be a source-to-source compiler that compiles the source code in the source programming language to one or more target programming languages where all target languages support implicit deallocation. In this case, the type checking may be performed for quality control such as, for example, to reduce or eliminate the need for garbage collection or cycle detection at runtime.

Figure 7A:
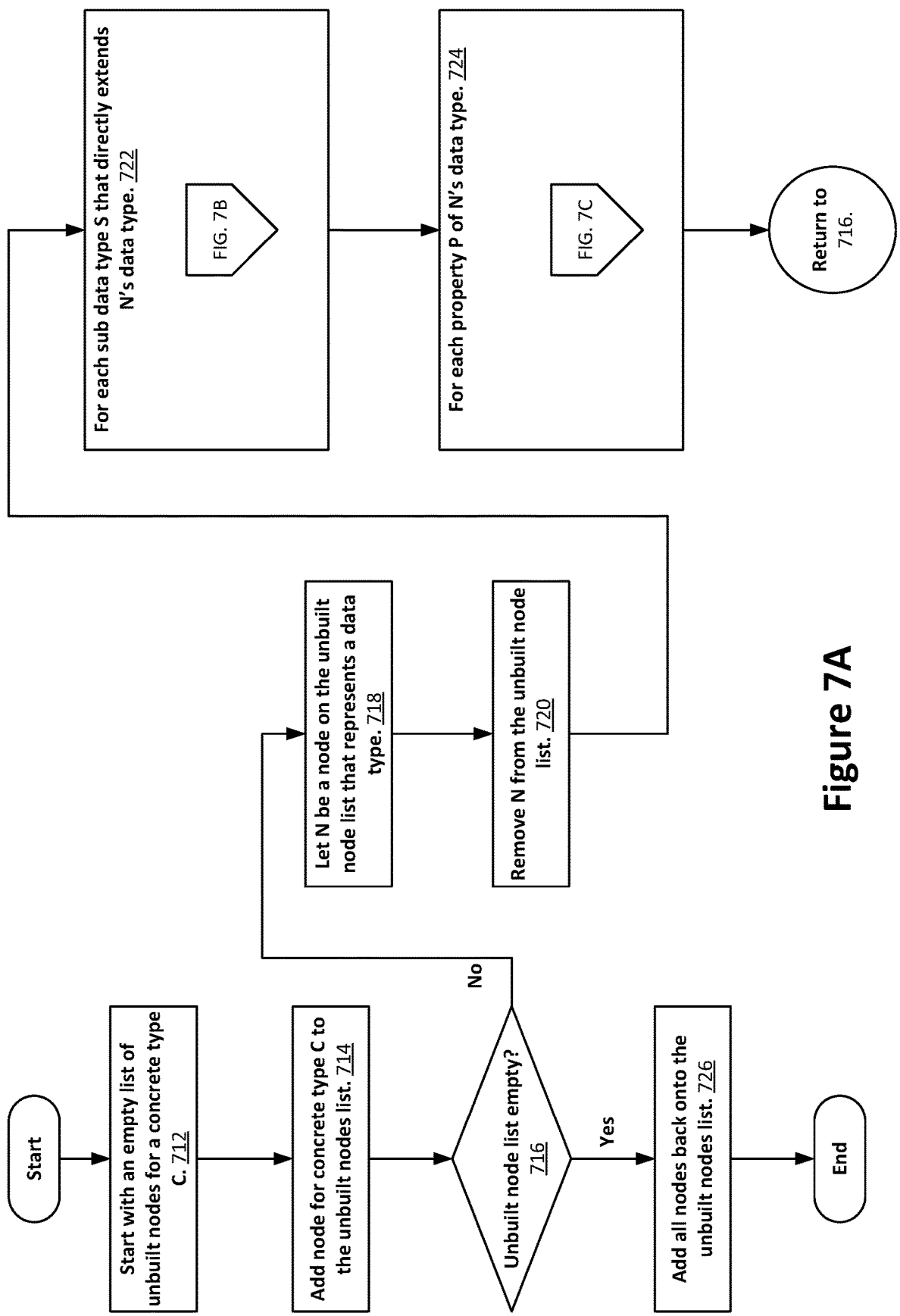
FIG. 7A, FIG. 7B, FIG. 7C, FIG. 7D, FIG. 7E, 7F, 7G, 7H are flowcharts of a data type checking process.

Starting with FIG. 7A, the data type checking process starts 712 with an empty list of unbuilt nodes for a data type checking graph for a concrete data type C defined in the source code. The empty list may be a suitable list data structure initialized in computer storage media. As a working example, the explanation of the data type checking process will use the following data type definitions expressed in a possible source programming language:

```
00: closed type List<E ⇥ Cons<E>>;
01: closed concrete type Cons<F ⇥ Cons<F>> extends List<F> {
02:   head: F;
03:   readonly early tail: List<F>;
04: }
05: closed concrete type Empty<G ⇥ Cons<G>> extends List<G> { }
```

In the working example, C is the concrete data type Cons<F>.

At operation 714, an element representing a node for the concrete data type C in the graph is added to the unbuilt node list. In the working example, an element representing a node for the concrete data type Cons<F> may be added to the unbuilt node list.

At operation 716, it is determined whether the unbuilt node list is empty (i.e., does not contain any elements). If the unbuilt node list is not empty, operations 718, 720, 722, and 724 are performed for a current node on the unbuilt node list.

At operation 718, a current node N on the unbuilt node list is identified. For example, the current node N can be the node corresponding to the element least recently added to the unbuilt node list. In the working example, the current node N may be the node added for the concrete data type Cons<F>.

At operation 720, the element representing the current node N is removed from the unbuilt node list. In the working example, the element representing the current node N for the concrete data type Cons<F> may be removed from the unbuilt node list.

Operation 722 is performed for each direct sub data type S defined in the source code that extends the data type represented by the current node N. A sub data type may directly extend the data type represented by the current node N in a sub class or child class sense as is typically allowed with object-oriented programming languages that support trait-based inheritance. The source programming language may support such trait-based inheritance. Traits provide a mechanism for fine-grained code reuse. A trait may be defined as a set of methods which is independent from any class hierarchy and can be flexibility used to build other traits or classes by means of a suite of composition operations.

Figure 7B:
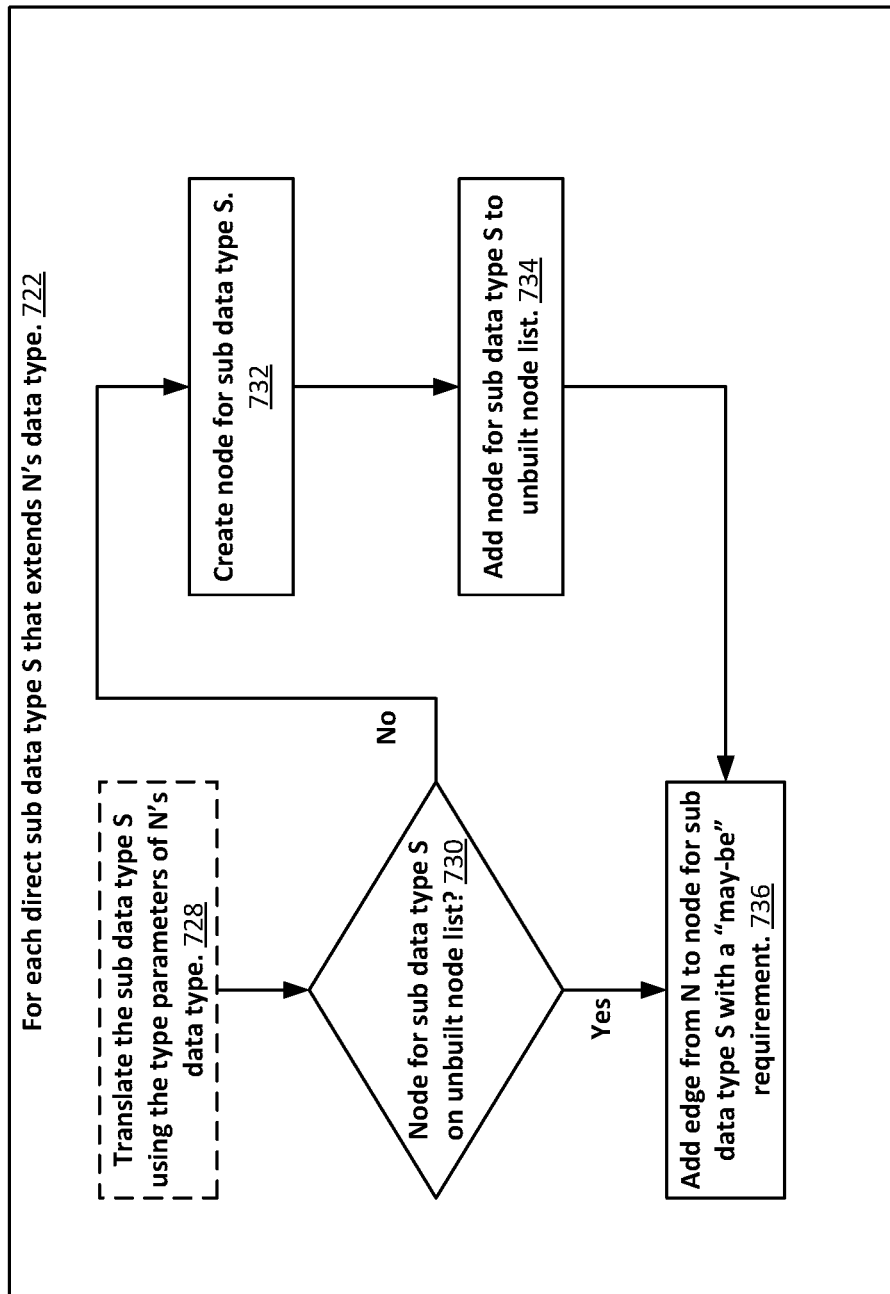

Operation 722 is depicted in greater detail with respect to FIG. 7B. In the working example, when the current node N is for the Cons<F> data type, operation 722 may not be performed for any direct sub data type S of the concrete data type Cons<F> because there are no direct sub data types defined that extend the Cons<F> data type.

Operation 724 is performed for each property P of the data type represented by the current node N. A property [AS12] of the data type may correspond to a member variable definition in the source code of the definition of the data type represented by the current node N. The member variable can be a static or instance variable of the data type. Operation 724 is depicted in greater detail with respect to FIG. 7C. In the working example, operation 724 may be performed for each of the head and tail properties defined for the Cons<F> data type.

After operations 718, 720, 722, and 724 are performed for the current node N, the process returns to operation 716 to consider any remaining elements on the unbuilt node list corresponding to other nodes. If there are no remaining elements on the unbuilt node list at operation 716, then, at operation 726, elements for all nodes removed at operation 720 are added back onto the unbuilt node list for further processing as described below with respect to FIG. 7D.

As mentioned, operation 722 of FIG. 7A is performed for each sub data type S in the source code that directly extends the data type represented by the current node N. FIG. 7B is a flowchart of operation 722.

At operation 728, if the current direct sub data type S is a generic type, then the current direct sub data type S is translated using the type parameters of the data type represented by the current node N. For example, given a type relationship such as "class Sub<X> extends Super<Bar<X>>" and a super type such as "Super<Bar<Baz>>," then the translation may include finding an appropriate binding for each of Sub's type parameters. In this example, X would bind to Baz and a translated sub data type would be Sub<Baz> because Sub<Baz> extends Super<Bar<Baz>> which is known because Sub<X> extends Super<Bar<X>> mirrors that when X is replaced with Baz, and there is no bound on X which would prevent X from binding to Baz.

At operation 730, it is determined whether an element representing a node for the current direct sub data type S is on the unbuilt node list. If not, then, at operation 732, an element is created for a node representing the current direct sub data type S and, at operation 734, the element is added to the unbuilt node list. In either case, an edge is added 736 to the data type definition graph for the concrete data type C where the edge is from the current node N to the node for the current direct sub data type S. The edge is qualified with a "may-be" requirement as in that a data object that is an instance of the data type represented by the current node N may also be an instance of the current direct sub data type S.

Figure 7C:
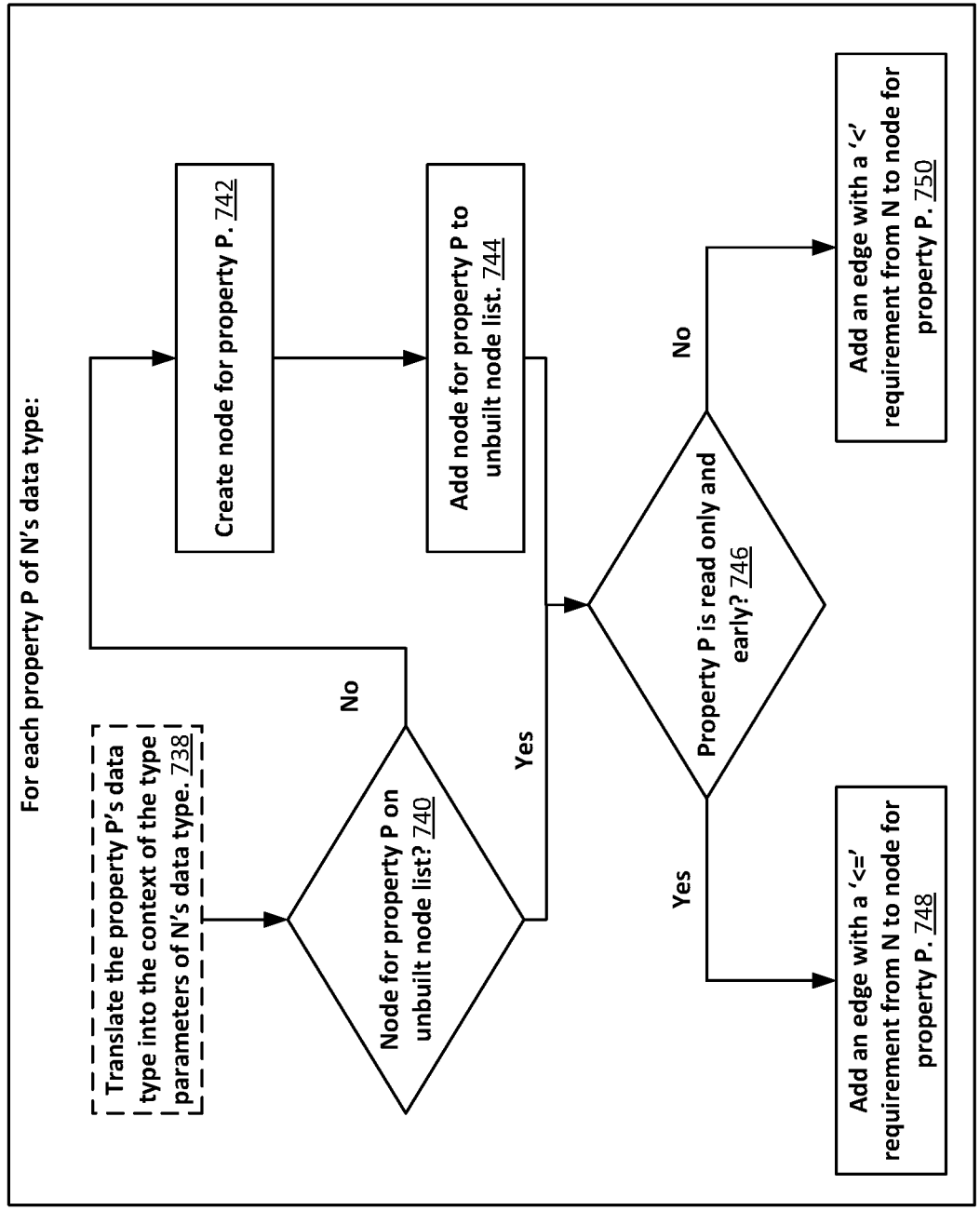

As mentioned, operation 724 of FIG. 7A is performed for each property P of the data type represented by the current node N as defined in the source code. FIG. 7C is a flowchart of operation 724. In the working example, if the current node N represents the Cons<F> data type, then operation 724 is performed for each of the head and tail properties.

At operation 738, the data type of the current property P is translated using the type parameters of the data type represented by the current node N. In the working example, when the current property P is the head property of the Cons<F> data type, then the data type of the current property P is the generic type F. When the current property is the tail property of the Cons<F> data type, then the data type of the current property P is List<F>.

At operation 740, it is determined whether an element representing a node for the data type of the current property P is on the unbuilt node list. If not, then, at operation 742, an element is created for a node representing the data type of the current property P. At operation 744, the element is added to the unbuilt node list. In the working example, when the current property P is the head property of the Cons<F> data type, then an element for a node in the graph representing the generic data type F is added to the unbuilt node list. When the current property P is the tail property of the Cons<F> data type, then an element for a node in the graph representing the List<F> data type is added to the unbuilt node list.

At operation 746, if the current property P is defined as read only and early. In the working example, when the current property P is the head property of the Cons<F> data type, then it may be determined that the current property P is not read only and early by the lack of such keyword hints in the property definition of the data type definition for the Cons<F> data type. On the other hand, it may be determined that the current property P is read only and early by the existence of such keyword hints in the property definition for the tail property for the Cons<F> data type, when the current property P is the tail property of the Cons<F> data type.

At operation 748, if the current property P is read only and early, then an edge is added to the data type definition graph for the concrete data type C where the edge is from the current node N to the node representing the data type of the current property P. The edge is qualified with a "<=" requirement. In the working example, an edge with a "<=" requirement would be added from the node representing the Cons<F> data type to the node representing the List<F> data type, when the current property P is the tail property of the Cons<F> data type because the tail property is read only and early.

At operation 750, if the current property P is not read only and early, then an edge is added to the data type definition graph for the concrete data type C where the edge is from the current node N to the node representing the data type of the current property P. In this case, the edge is qualified with a "<" requirement. In the working example, an edge with a "<" requirement would be added from the node representing the Cons<F> data type to the node representing the F data type, when the current property P is the head property of the Cons<F> data type because the head property is not read only and early.

In the working example, after operation 724 is performed for the head and tail properties of the Cons<F> data type, the process returns to operation 716 to determine if the unbuilt node list is empty. Since elements for generic data type F and the List<F> data type was added to the unbuilt node list, the list is not empty. These nodes will be removed from the list at operation 720. Operation 722 will be performed by the List<F> data type because it has a direct sub data type Empty<F> that extends the List<F> data type. Operation 722 will not be performed for the generic data type F because there are no direct sub data types that extend the generic data type F. Operation 724 will not be performed for either the generic data type F or the List<F> data type because there are no defined properties of those data types. As a result of performing operation 722 for the List<F> data type, a node for the Empty<F> data type will be added to the graph (operation 734) and an edge with a "may-be" requirement is added from the node for the List<F> data type to the new node for the Empty<F> data type (operation 736). When the process returns to operation 716 again, only an element for the node representing Empty<F> data type is then on the unbuilt node list. That element will be removed at operation 720 and operations 722 and 724 will not be performed for the node because the Empty<F> data type does not have any direct sub data types that extend it or any defined properties.

Figure 7D:
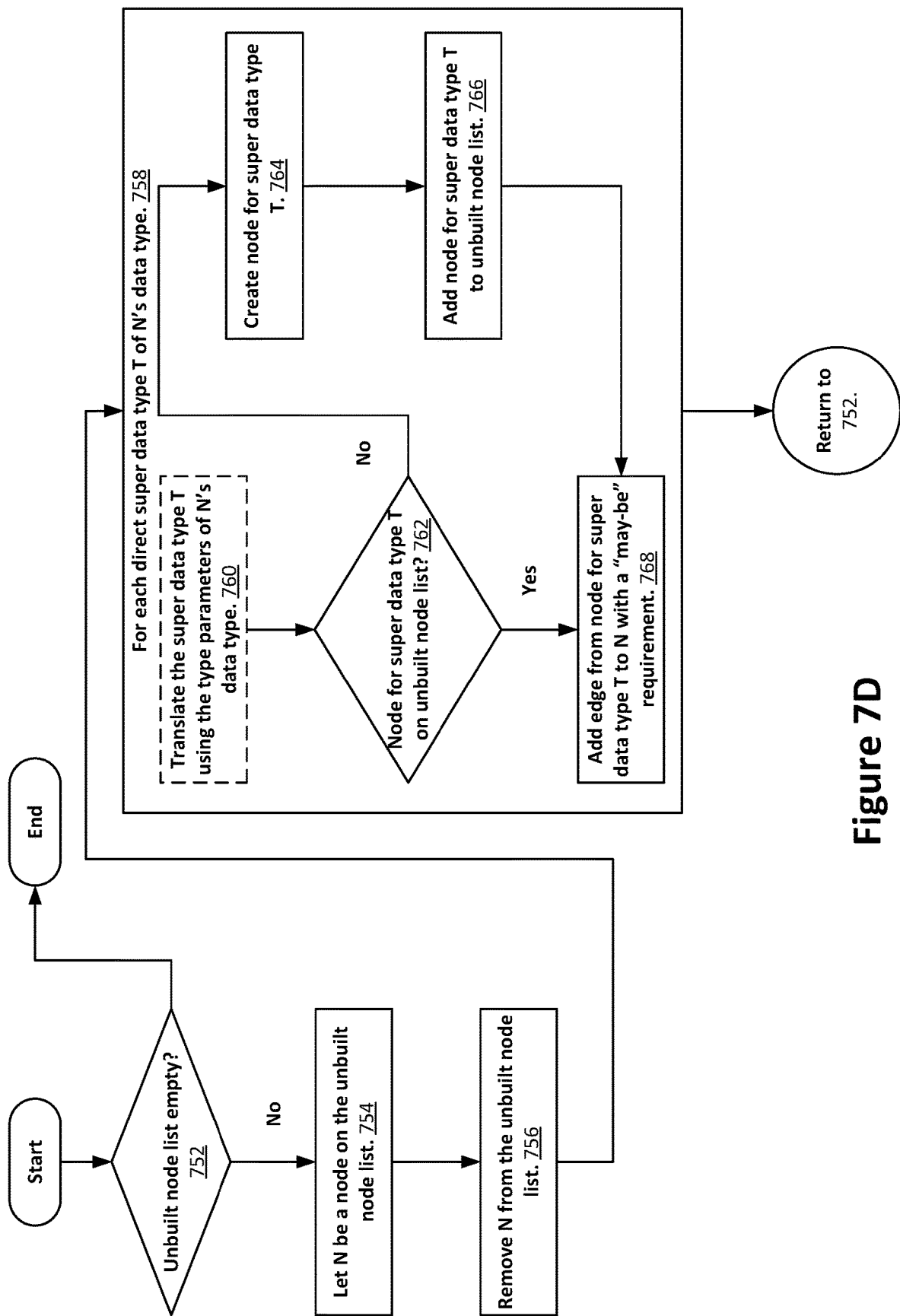

Referring now FIG. 7D, the data type checking process for the concrete data type C continues with the list of unbuilt nodes resulting from operation 726 of FIG. 7A after elements for all nodes built according to the sub-processes of FIG. 7A, FIG. 7B, and FIG. 7C have been added back to the unbuilt node list. In the working example, there are nodes for the following data types at this point in the process: Empty<F>, List<F>, F, and Cons<F>. Elements for those nodes are added back onto the unbuilt node list.

At operation 752, it is determined whether the unbuilt node list is empty (i.e., does not contain any elements). If the unbuilt node list is not empty, operations 754, 756, and 758 are performed for a current node on the unbuilt node list to build the node.

At operation 754, the current node N on the unbuilt node list is identified. For example, the current node N can be the node corresponding to the element least recently added to the unbuilt node list.

At operation 756, the element representing the current node N is removed from the unbuilt node list.

Operations 760, 762, 764, 766, and 768 may be performed for each super data type from which the data type represented by the current node N directly extends as defined in the source code. The data type represented by the current node N may directly extend a super data type in a super class or parent class sense as is typically allowed with object-oriented programming languages that support trait-based inheritance. The source programming language may support trait-based inheritance.

For purposes of operations 760, 762, 764, 766, and 768, if the data type represented the current node N does not directly extend a super data type as defined in the source code, then the data type is considered to directly extend a hypothetical "Top" super data type which represents a hypothetical super data type of every other data type. As such, at least operation 768 is performed for each current node N that is considered to directly extend the Top super data type and operations 746 and 766 are each performed once for the Top super data type.

At operation 760, if the current direct super type T is a generic type, then the current direct super data type T is translated using the type parameters of the data type represented by the current node N.

At operation 762, it is determined whether an element representing a node for the current direct super data type T is on the unbuilt node list. If not, then, at operation 764, an element is created for a node representing the current direct super data type T and, at operation 766, the element is added to the unbuilt node list. In either case, at operation 768, an edge is added to the data type definition graph for the concrete data type C where the edge is from the node for the current direct super data type T to the current node N. The edge is qualified with a "may-be" requirement as in that a data object that is an instance of the current direct super data type T may also be an instance of the data type represented by the current node N.

After operations 754, 756, and 758 are performed for the current node N, the process returns to operation 752 to consider any remaining elements on the unbuilt node list corresponding to other nodes. If there are no remaining elements on the unbuilt node list at operation 752, then, the sub-process depicted by the flowchart of FIG. 7D ends.

In the working example, a node for List<F> which is a super data type of the Cons<F> data type is already in the graph for the concrete data type Cons<F>. At operation 768, an edge is added to the graph from the node for List<F> to the node for the Cons<F> data type with a "may-be" requirement. The List<F> data type is also a super data type of the Empty<F> data type. However, an edge with a "may-be" requirement has already been added from the node for List<F> to the node for the Empty<F> data type at operation 736 of FIG. 7B when considering the direct sub data types that extend the List<F> data type. So, it does not need to be added again at operation 768. Also, at operation 768, an edge with a "may-be" requirement is also added from the Top super data type of everything node to the node representing the generic data type F. Similarly, operation 768, an edge with a "may-be" requirement is added from the Top super data type node to the node representing the List<F> generic data type.

Figure 7E:
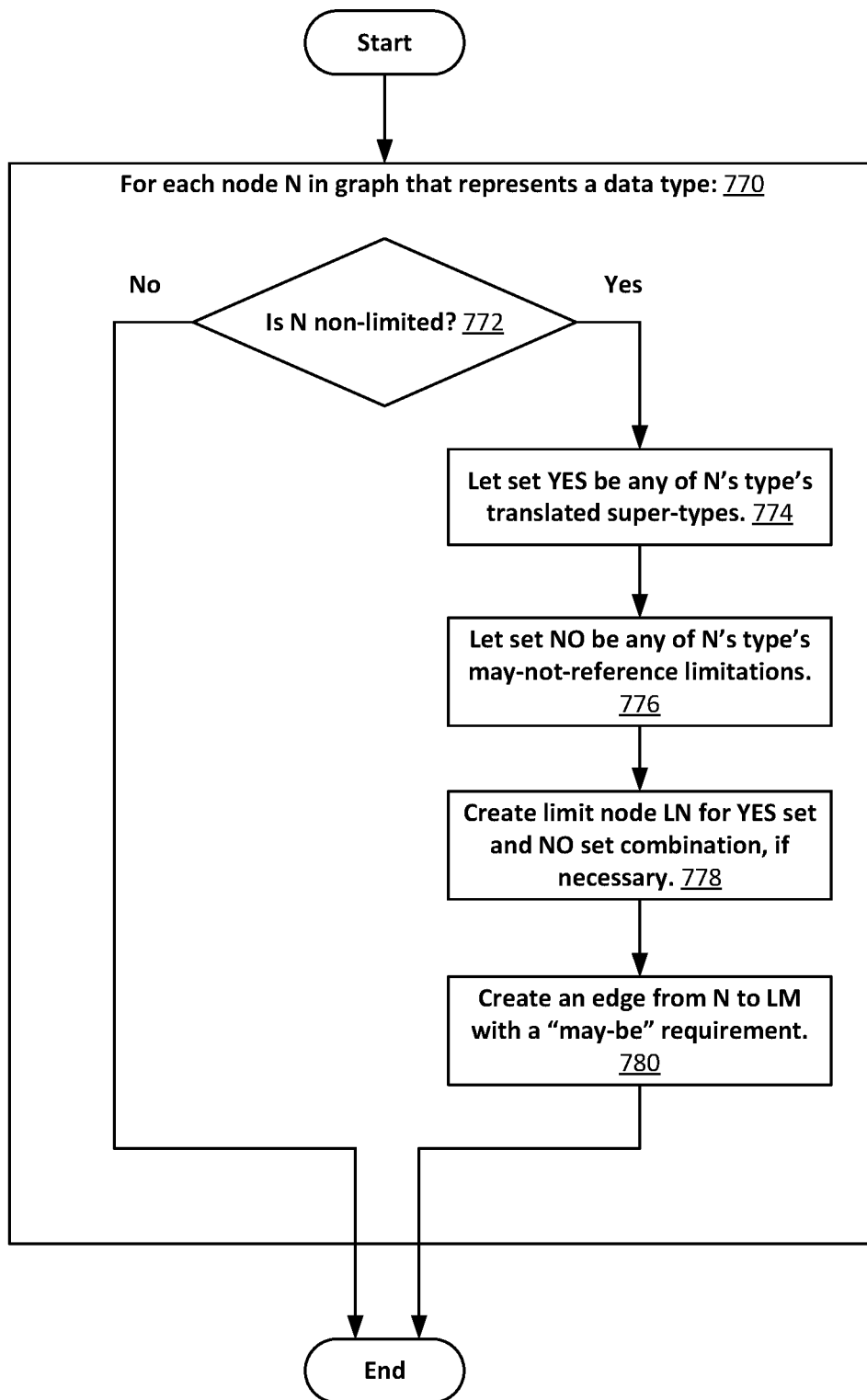

Referring now to FIG. 7E, the data type checking process for the concrete data type C continues with the nodes and edges of the data type definition graph for the concrete data type C as they exist after the performance of the sub-processes depicted by the flowcharts of FIG. 7A, FIG. 7B, FIG. 7C, and FIG. 7D are performed for the concrete data type C.

At this point in construction of the graph for concrete data type C, the graph is composed of data type nodes but not limit nodes. The data type nodes in the graph are created based on the direct sub data types of the concrete data type C, data types of properties of the concrete data C, and super data types of those direct sub-data types, those property data types, and the concrete data type C as described above with respect to FIG. 7A, FIG. 7B, FIG. 7C, and FIG. 7D.

Limit nodes may be added by the compiler to the data type definition graph for concrete data type C to group non-limit data type nodes. A non-limit data type node in this context is a node that represents a data type that is either: (a) an unclosed data type in the sense that not all sub data types are known to the compiler at compile time or (b) a generic data type.

Operation 770 may be performed for each node in the graph that is a data type node. At operation 772, it is determined whether the data type represented by the current data type node N is non-limited. If no, then operations 774, 776, 778, and 780 are not performed for the current data type node N. If yes, then operations 774, 776, 778, and 780 are performed for the current data type node N. In the working example, the nodes for the Top, Empty<F>, List<F>, F, and Cons<F> data types are the data types nodes of the graph. Of those, the nodes for Empty<F>, List<F>, F, and Cons<F> data types are non-limited because those data types are generic data types.

At operation 774, a "YES" set of data types that are the translated super data types of the data type represented by the current data type node N is determined.

At operation 776, a "NO" set of may not reference limitations on the data type represented by the current data type node N is determined.

At operation 778, if no limit node LN has been added to the graph for the concrete data type C for the combination of current YES set and the current NO set, then a limit node LN is created for combination and added to the graph.

At operation 780, an edge with a "may-be" requirement is added to the graph from the node N representing the current data type to the limit node LN for the current YES and NO combination.

Figure 7F:
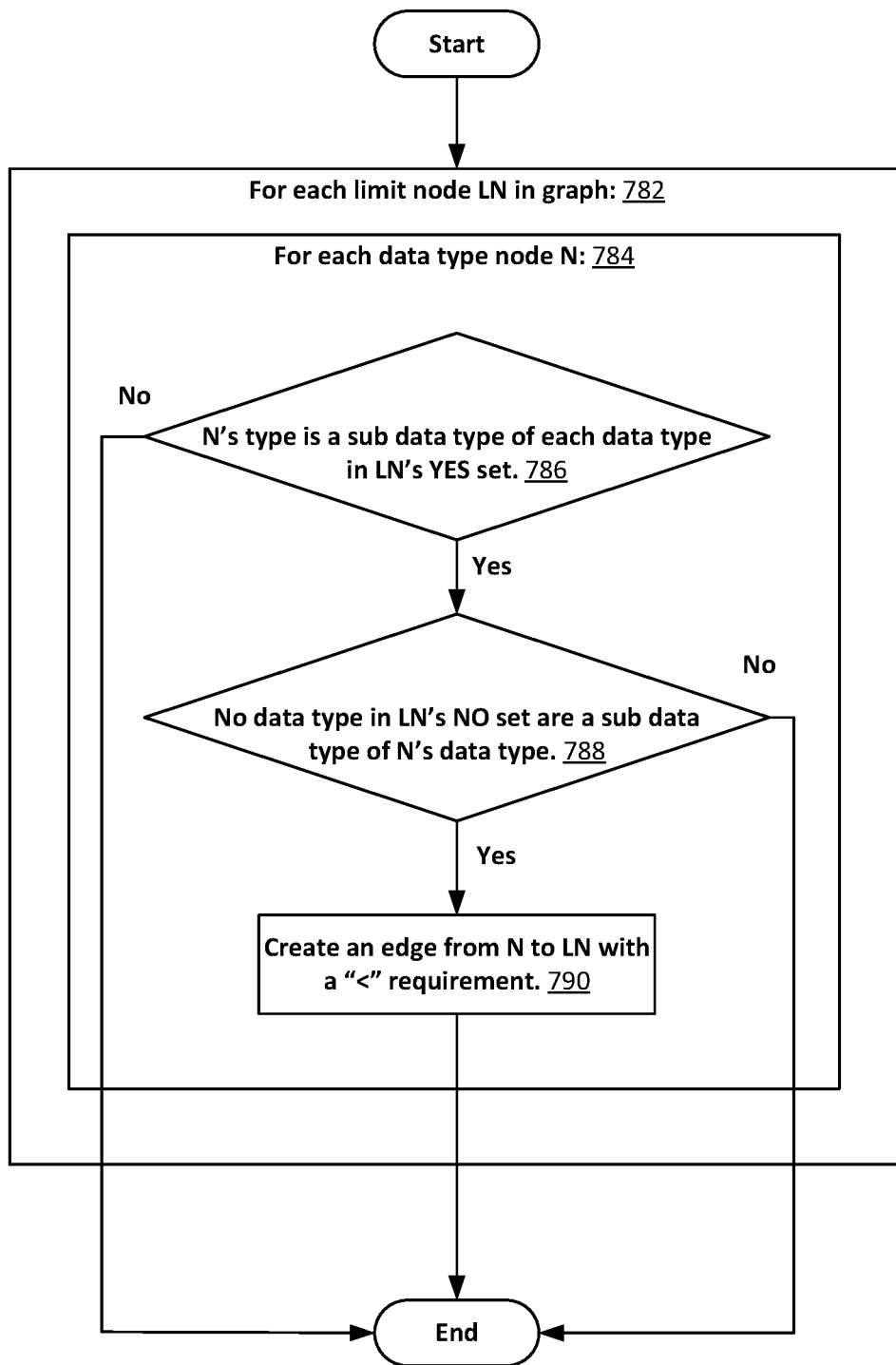

Referring now to FIG. 7F, the data type checking process for the concrete data type C continues with the nodes and edges of the data type definition graph for the concrete data type C as they exist after the performance of the sub-processes depicted by the flowcharts of FIG. 7A, FIG. 7B, FIG. 7C, FIG. 7D, and FIG. 7E are performed for the concrete data type C.

Operation 782 is performed for each limit node in the graph. And for each limit node in the graph, operation 784 is performed for each data type node in the graph.

At operation 786, it is determined whether the data type of the current node N is a sub data type of each data type in the YES set (operation 774 of FIG. 7E) for the current limit node LN. If so, then the process proceeds to operation 788. If not, then the sub-process of FIG. 7F ends.

At operation 788, it is determined whether any data type in the NO set (operation 776 of FIG. 7E) for the current limit node LN is a sub data type of the data type of the current node N. If so, then the sub-process of FIG. 7F ends.

Otherwise, at operation 790, an edge is created in the graph from the current limit node LN to the current data type node N with a less than '<' requirement.

Figure 7G:
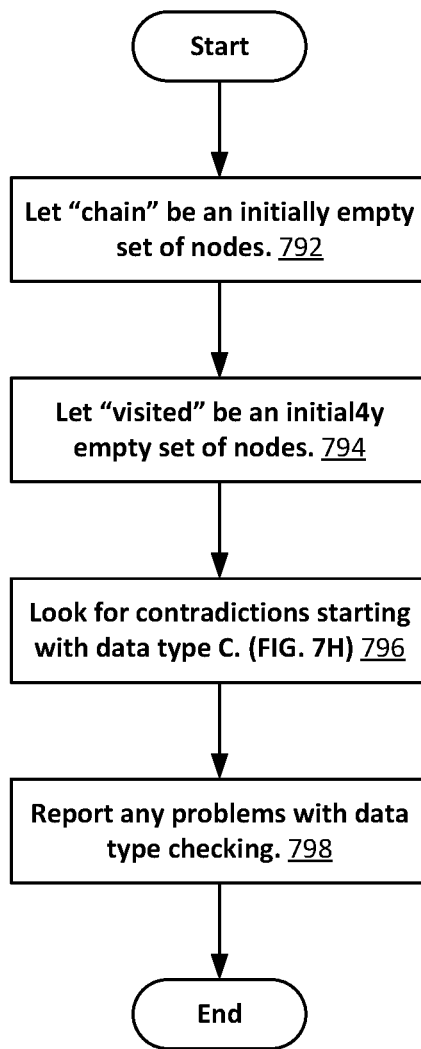

Referring now to FIG. 7G, the data type checking process for the concrete data type C continues with the nodes and edges of the data type definition graph for the concrete data type C as they exist after the performance of the sub-processes depicted by the flowcharts of FIG. 7A, FIG. 7B, FIG. 7C, FIG. 7D, FIG. 7E, and FIG. 7F are performed for the concrete data type C.

At operation 792, a set CHAIN is initialized to be an empty set of edges.

At operation 794, a set VISITED is initialized to be an empty set of nodes.

At operation 796, a sub-process is invoked starting with the concrete data type C for which the data type definition graph was generated according to the sub-processes of FIG. 7A, FIG. 7B, FIG. 7C, FIG. 7D, FIG. 7E, and FIG. 7F. The sub-process looks for contradictions in the graph and is explained in greater detail below with respect to FIG. 7H.

At operation 798, any problems detected during the type checking process are reported. For example, for each potential reference cycle identified in source code written in the source programming language, output to a computer user interface such as a command line interface or a graphical user interface or to a file or database that provides a human-readable description of a potential reference cycle can be provided. The output might be text such as, for example, "A value of type 'Thing' may refer to itself via its property 'otherThing'. 'aThing.otherThing=aThing;' would create a reference cycle." The output may be derived from metadata associated with nodes or edges of the data type definition graph for a concrete data type C for which a potential reference cycle was detected. The output may also suggest how to correct the problem such as by avoiding the potential reference cycle. The output may be input to an integrated development environment (IDE) program to change the source code based automatically or based on a suggestion chosen or approved by a human programmer.

Figure 7H:
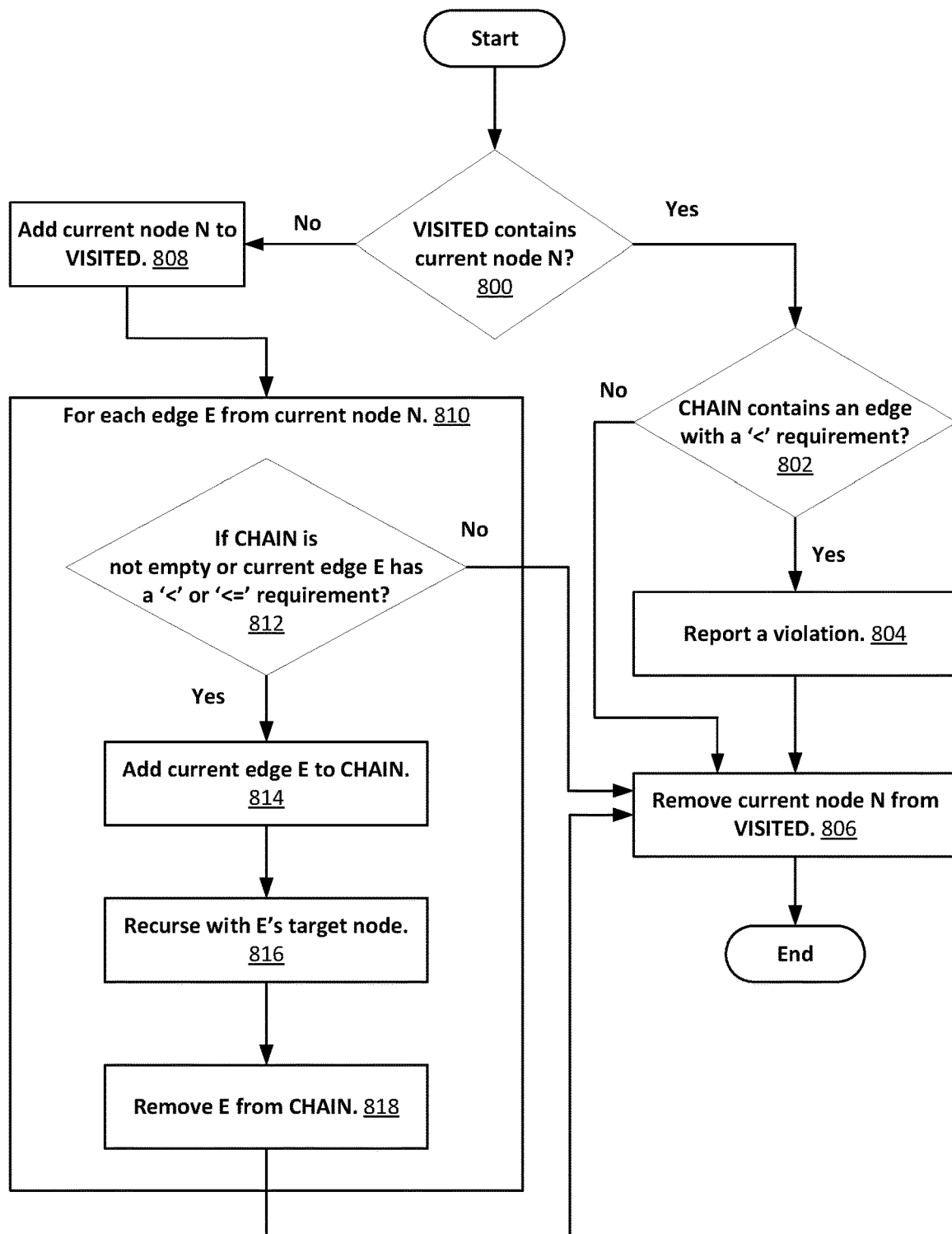

Referring now to FIG. 7H, it is a flowchart of the look for contradictions sub-process invoked at operation 796 of the sub-process of FIG. 7G. The sub-process is invoked with a current node N. The sub-process may also be recursive or implemented in a non-recursive but equivalent way. For the first invocation of the look for contradictions sub-process, the current node N is the node in the graph representing the concrete data type C for which the data type definition graph was generated.

At operation 800, it is determined whether the current node N is in the VISITED set. If the current node N is in the VISITED set, then the look for contradictions sub-process proceeds to operation 802.

At operation 802, it is determined whether the CHAIN set contains an edge with a '<' requirement. If so, then the sub-process proceeds to operation 804.

At operation 804, a potential reference cycle problem with the concrete data type C is reported. For example, the problem may be reported using the set of edges in the CHAIN set to derive a human readable explanation of the problem.

If, at operation 802, there are no edges in the CHAIN set with a '<' requirement, then, at operation 806, the current node N is removed from the VISITED set and the current invocation of the look for contradictions sub-process returns/ends.

If, at operation 800, if the current node N is not in the VISITED set, then, at operation 808, the current node N is added to the VISITED set.

Operation 810 is performed for each edge in the graph from the current node N.

At operation 812, if the CHAIN set is empty or if the current edge E has a '<' or a '<=' requirement, then, at operation 814, the current edge E is added to the CHAIN set, the look for contradictions sub-process is invoked recursively 816 providing the target node in the graph of the current edge E as the input node to the recursive invocation, and when the recursive invocation returns/end the current edge E is removed 818 from the end of the CHAIN set before proceeding to operation 806. If, at operation 812, CHAIN Is not empty or if the current edge E does not have a '<' or a '<=' requirement, then the sub-process proceeds to operation 806.

Benefits

There are a number of benefits of provably acyclic objects. For one, referencing counting is sufficient for timely deallocation of objects at runtime. For another, certain runtime meta operations become simplified and more reliable including:
  comparing two objects at runtime to find out whether they are structurally (i.e., determining that the two objects are the same type of object whose corresponding properties are themselves structurally equivalent),
  deriving a fingerprint for an object at runtime that is independent of how its parts are arranged in memory,
  serializing an object for transmission to another computing process or computer, and
  converting an object to a diagnostic form that can be shown to a human programmer who is debugging a problem.

A reference cycle free data type definition also has benefits in distributed computing systems. For example, distributed garbage collection may require substantial inter-process communication (e.g., data network) messaging back and forth between distributed computing processes when many property values are on different computing nodes of the system than the objects that contain the property values. On the other hand, if all data types are acyclic, distributed garbage collection can be replaced with distributed referencing counting, and reference count updates can be batched into fewer smaller messages that can be acted at nodes in the system with less waiting by the computing processes at the nodes.

Basic Computing Device

The techniques may be implemented by at least one computing device. If by more than one computing device, the techniques may be implemented in whole or in part using a combination of computing devices that are coupled together using a network, such as a packet data network. A computing device used in an implementation of the techniques may be hard-wired to perform some or all of the techniques, or may include digital electronic devices such as at least one application-specific integrated circuit (ASIC) or field programmable gate array (FPGA) that is persistently programmed to perform some or all of the techniques, or may include at least one general purpose hardware processor programmed to perform some or all of the techniques pursuant to program instructions in firmware, memory, other storage, or a combination. A computing device used in an implementation of the techniques may also combine custom hard-wired logic, ASICs, or FPGAs with custom programming to accomplish some or all of the techniques. A computing device used in an implementation of the techniques may be a server computing device, a workstation computing device, a personal computing device, a portable computing device, a handheld computing device, a mobile computing device or any other computing device that incorporates hard-wired or program logic to implement some or all of the techniques.

Figure 8:
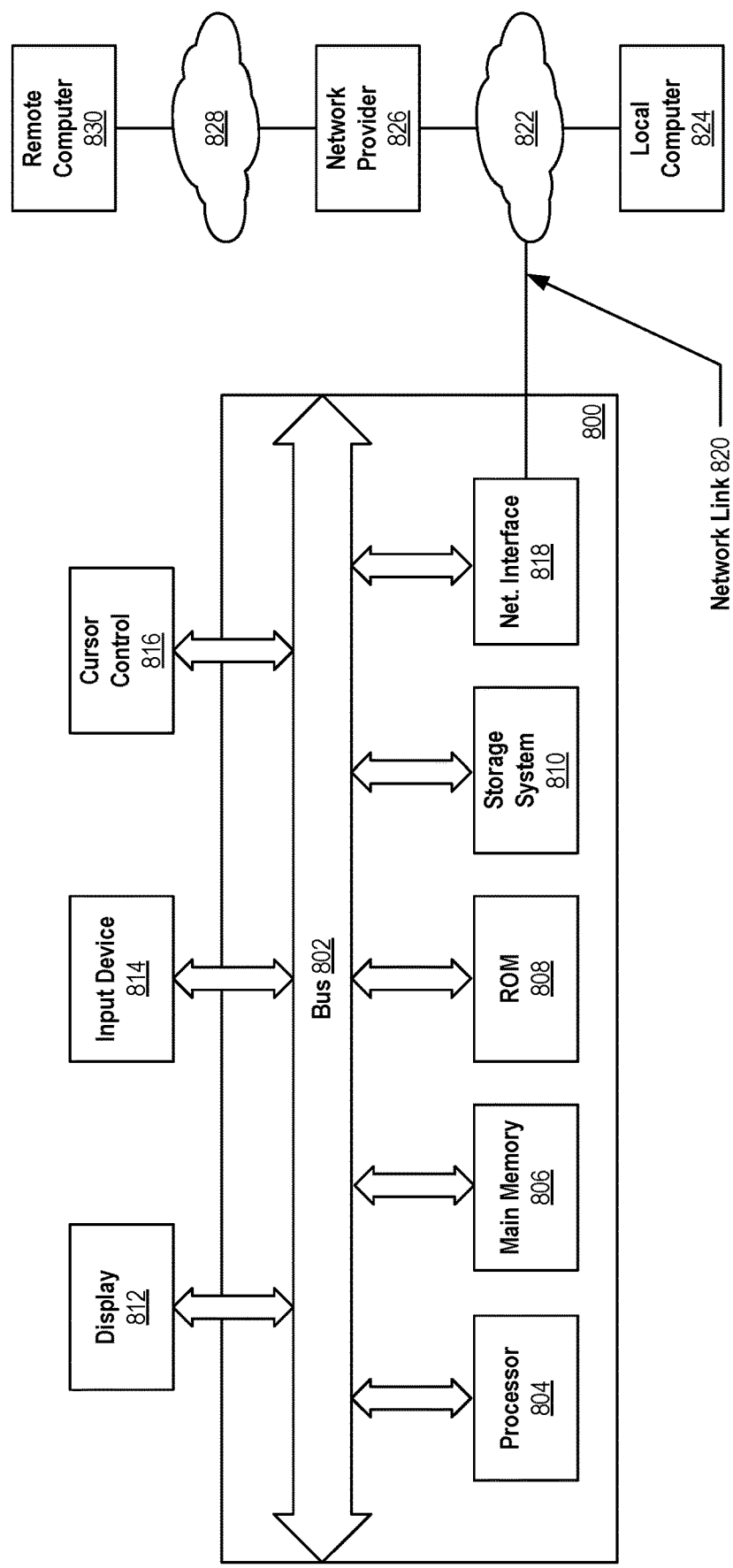
FIG. 8 is a block diagram of an example basic computing device that may be used in an implementation of the techniques.

FIG. 8 is a block diagram of an example basic computing device that may be used in an implementation of the techniques. In the example of FIG. 8, computing device 800 and instructions for implementing some or all the techniques in hardware, software, or a combination of hardware and software, are represented schematically, for example as boxes and circles, at the same level of detail that is commonly used by persons of ordinary skill in the art to which this disclosure pertains for communicating about computer architecture and computing device implementations.

Computing device 800 includes an input/output (I/O) subsystem 802 which may include a bus or other communication mechanism for communicating information or instructions between the components of the computing device 800 over electronic signal paths. The I/O subsystem 802 may include an I/O controller, a memory controller and at least one I/O port. The electronic signal paths are represented schematically in the drawings, for example as lines, unidirectional arrows or bidirectional arrows.

At least one hardware processor 804 is coupled to I/O subsystem 802 for processing information and instructions. Hardware processor 804 may include, for example, a general-purpose microprocessor or microcontroller or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computing device 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory storage media accessible to processor 804, can render computing device 800 into a special-purpose machine that is customized to perform the operations specified in the instructions.

Computing device 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute some or all the techniques.

The instructions in memory 806, ROM 808 or storage 810 may comprise one or more sets of instructions that are organized as modules, methods, objects, functions, routines or calls. The instructions may be organized as one or more computer programs, operating system services or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computing device 800 may be coupled via I/O subsystem 802 to at least one output device 812. Output device 812 may be a digital computer display. Examples of a display that may be used include a touch screen display or a light-emitting diode (LED) display or a liquid crystal display (LCD) or an e-paper display. Computing device 800 may include other types of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

An input device 814 may be coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

Computing device 800 may comprise an internet of things (IoT) device or other computing appliance in which one or more of the output device 812, input device 814, and control device 816 are omitted. The input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator, or a servo.

When computing device 800 is a mobile or portable computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computing device 800. Output device 812 may include hardware, software, firmware and interfaces for generating position reporting packets, notifications, pulse or heartbeat signals, or other recurring data transmissions that specify a position of the computing device 800, alone or in combination with other application-specific data, directed toward host 824 or server 830.

Computing device 800 may implement some or all of the techniques using customized hard-wired logic, at least one ASIC or FPGA, firmware or program instructions or logic which when loaded and used or executed in combination with computing device 800 causes or programs computing device 800 to operate as a special-purpose machine.

The techniques performed by computing device 800 may be performed in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform some or all the techniques. Hard-wired circuitry may be used in place of or in combination with software instructions.

The term "storage media" as used herein refers to any non-transitory computer-readable media that store data or instructions that cause a machine to operation in a specific fashion. Such storage media may comprise non-volatile media or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computing device 800 can receive the data on the communication link and convert the data to be read by computing device 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computing device 800 also includes a communication interface 818 coupled to bus 802. Communication interface 818 provides a two-way data communication coupling to network link 820 that is directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls.

Computing device 800 and server 830 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or NoSQL, an object store, a graph database, a flat file system or other data storage.

Computing device 800 can send messages and receive data and instructions, including program code, through a network, network link 820 and communication interface 818. In the Internet example, server 830 might transmit a requested code for an application program through Internet 828, ISP 826, local network 822 and communication interface 818. The received code may be executed by processor 804 as it is received, or stored in storage 810, or other non-volatile storage for later execution.

Basic Software System

Figure 9:
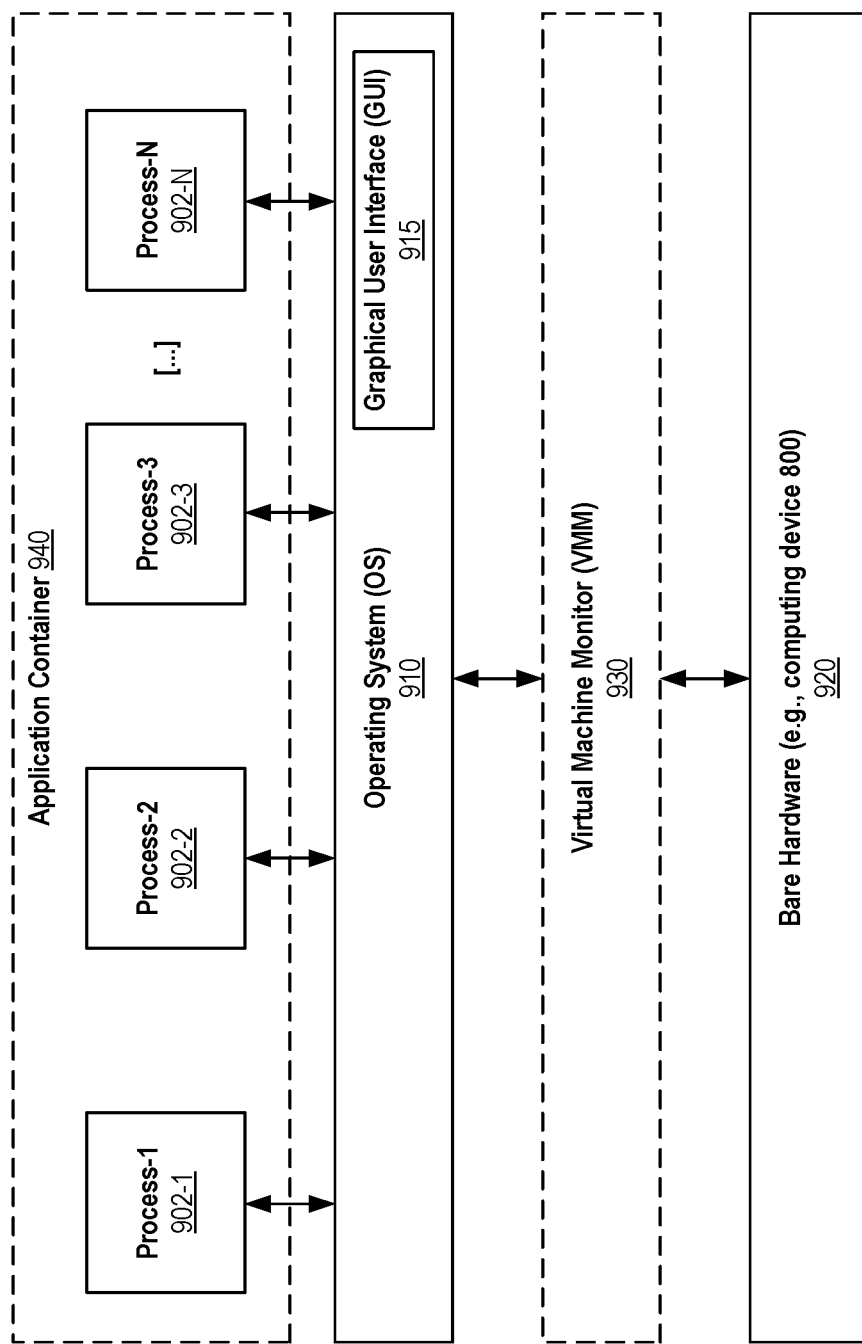
FIG. 9 is a block diagram of an example basic software system that may be employed for controlling the operation of the basic computing device of FIG. 8.

FIG. 9 is a block diagram of an example basic software system 900 that may be employed for controlling the operation of computing device 800 of FIG. 8. Software system 900 and its components, including their connections, relationships, and functions, is meant to be an example only, and not meant to limit implementations of the techniques. Other software systems suitable for implementing the techniques may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, represented as 902-1, 902-2, 902-3 . . . 902-N, memory allocation, file input and output (I/O) and device I/O. One or more application programs may be "loaded" (e.g., transferred from fixed storage 810 into memory 806) for execution as one or more processes by the system 900. The applications or other software intended for use on computing device 800 may also be stored as a set of downloadable computer-executable instructions, for example, for downloading and installation from an Internet location (e.g., a Web server, an app store or other online service).

The execution of application program instructions may implement a process (e.g., 902-2) in the form of an instance of a computer program that is being executed and consisting of program code and its current activity. Depending on the operating system (OS), a process (e.g., 902-3) may be made up of multiple threads of execution that execute instructions concurrently. In this context, a computer program is a passive collection of instructions, while a process (e.g., 902-1) may be the actual execution of those instructions. Several processes (e.g., 902-1 and 902-2) may be associated with the same program; for example, opening up several instances of the same program often means more than one process is being executed, or a program that initially launches as a single process may subsequently spawn (e.g., fork) additional processes.

OS 910 may implement multitasking to allow processes 902-1, 902-2, 902-3 . . . 902-N to share processor 804. While each processor 804 or core of the processor executes a single task at a time, computing device 800 may be programmed to implement multitasking to allow each processor to switch between tasks that are being executed without having to wait for each task to finish. Switches may be performed when tasks perform input/output operations, when a task indicates that it can be switched, or on hardware interrupts. Timesharing may be implemented to allow fast response for interactive user applications by rapidly performing context switches to provide the appearance of concurrent execution of multiple processes simultaneously. For security and reliability, OS 910 may prevent direct communication between independent processes, providing strictly mediated and controlled inter-process communication functionality.

In some instances, processes 902-1, 902-2, 902-3 . . . 902-N and the application programs they implement may execute within application container 940. Application containers generally are a mode of operation of OS 910 in which OS 910 allows the existence of multiple isolated user space instances to run on OS 910. Application container 940 is an example of one such instance. The instances themselves are sometimes alternatively referred to as zones, virtual private servers, partitions, virtual environments, virtual kernels, or jails. Application containers provide a mechanism whereby finite hardware computing resources such as CPU time and storage media space can be allocated among the instances.

Software system 900 includes a graphical user interface (GUI) 915, for receiving user commands and data in a graphical (e.g., "point-and-click" or "touch gesture") fashion. These inputs, in turn, may be acted upon by system 900 in accordance with instructions from operating system 910 or processes 902-1, 902-2, 902-3 . . . 902-N. GUI 915 also serves to display the results of operation from OS 910 and processes 902-1, 902-2, 902-3 . . . 902-N 902, whereupon the user may supply additional inputs or terminate the session (e.g., log off).

OS 910 can execute directly on bare hardware 920 (e.g., processor 804) of computing device 800. Alternatively, a hypervisor or virtual machine monitor (VMM) 930 may be interposed between bare hardware 920 and OS 910. In this configuration, VMM 930 acts as a software "cushion" or virtualization layer between OS 910 and bare hardware 920 of computing device 800.

VMM 930 instantiates and runs one or more virtual machine instances ("guest machines"). Each guest machine comprises a "guest" operating system, such as OS 910, and one or more applications, such as applications 902, designed to execute on the guest operating system. VMM 930 presents the guest operating systems with a virtual operating platform and manages the execution of the guest operating systems.

In some instances, VMM 930 may allow a guest operating system to run as if it is running on bare hardware 920 of computing device 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930. In these instances, the guest operating system is "aware" that it executes on a virtual machine monitor. In other words, VMM 930 may provide para-virtualization to a guest operating system in some instances.

Cloud Computing

The techniques may be implemented in a "cloud computing" environment. The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (e.g., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (e.g., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

OTHER ASPECTS OF THE DISCLOSURE

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. may be either X, Y, or Z, or a combination thereof. Thus, such conjunctive language is not intended to require by default implication that at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, the techniques have been described with reference to numerous specific details that may vary from implementation to implementation. The specification and drawings are, accordingly, to be regarded in an illustrative rather than a restrictive sense.

What is claimed is:

1. A method performed by a compiler or a data type checking tool, the method comprising:
   detecting a data type definition in a programming language source code for a library;
   determining, from the programming language source code for the library, whether the data type definition allows for a reference cycle at runtime; and
   based on determining that the data type definition allows for the reference cycle at runtime, halting compilation of the programming language source code for the library or outputting an alert pertaining to the allowance of the reference cycle at runtime to a user interface, a file, a database, or an integrated development environment.

2. The method of claim 1, further comprising:
   the compiler or the data type checking tool determining whether the data type definition allows for the reference cycle at runtime based on the compiler or the data type checking tool determining, from the programming language source code for the library, whether a property defined by a property definition of the data type definition is read-only.

3. The method of claim 2, further comprising:
   the compiler or the data type checking tool determining whether the property is read-only based on the compiler or the data type checking tool determining whether the property definition of the data type definition comprises an explicit hint that the property is read-only.

4. The method of claim 2, further comprising:
   the compiler or the data type checking tool determining whether the property is read-only based on the compiler or the data type checking tool determining whether the property definition of the data type definition comprises an annotation that has a meaning opposite of read-only.

5. The method of claim 2, further comprising:
the compiler or the data type checking tool determining whether the property is read-only based on the compiler or the data type checking tool determining that none of the programming language source code for the library that could set the property after the property is assigned an initial value does so.

6. The method of claim 2, further comprising:
the compiler or the data type checking tool inserting extra instructions into the programming language source code for the library or an executable program to cause an assignment of the property after the property is initialized to fail.

7. The method of claim 2, further comprising:
the compiler or the data type checking tool determining whether the data type definition allows for the reference cycle at runtime based on the compiler or the data type checking tool determining whether a constructor definition of the data type definition initializes the property using a reference to an object defined by the data type definition as a value.

8. The method of claim 1, further comprising:
the compiler or the data type checking tool determining whether the data type definition allows for the reference cycle at runtime based on the compiler or the data type checking tool determining that the data type definition is closed such that any and all sub-data types of a data type defined by the data type definition are determined by the compiler or the data type checking tool from the programming language source code for the library.

9. The method of claim 1, further comprising:
the compiler or the data type checking tool determining whether the data type definition allows for the reference cycle at runtime based on the compiler or the data type checking tool determining that the data type definition is concrete such that an instance of a data type defined by the data type definition is allowed to exist at runtime where the instance of the data type is not a sub-type of the data type.

10. The method of claim 1, further comprising:
the compiler or the data type checking tool determining whether the data type definition allows for the reference cycle at runtime based on the compiler or the data type checking tool building a graph of potential type containment relationships and determining whether the graph of potential type containment relationships contains a cycle with particular kinds of edges.

11. The method of claim 10, wherein a node of the graph of potential type containment relationships corresponds to a data type defined by the data type definition.

12. The method of claim 10, wherein a node of the graph of potential type containment relationships corresponds to a worst-case assumption about a generic type parameter of the programming language source code for the library.

13. The method of claim 12, wherein the worst-case assumption comprises a may-not-reference bound on the generic type parameter of the programming language source code for the library.

14. The method of claim 10, further comprising:
the compiler or the data type checking tool determining whether the data type definition allows for the reference cycle at runtime based on the compiler or the data type checking tool determining that the data type definition is closed; and
the compiler or the data type checking tool associating a node or an edge of the graph of potential type containment relationships with metadata reflecting that the data type definition is closed.

15. The method of claim 10, further comprising:
the compiler or the data type checking tool determining whether the data type definition allows for the reference cycle at runtime based on the compiler or the data type checking tool determining that a property defined by a property definition of the data type definition is early; and
the compiler or the data type checking tool associating a node or an edge of the graph of potential type containment relationships with metadata reflecting that the property is early.

16. The method of claim 10, further comprising:
the compiler or the data type checking tool determining whether the data type definition allows for the reference cycle at runtime based on the compiler or the data type checking tool determining that a property defined by a property definition of the data type definition is read-only; and
the compiler or the data type checking tool associating a node or an edge of the graph of potential type containment relationships with metadata reflecting that the property is read-only.

17. The method of claim 1, wherein the data type definition defines a generic data type.

18. The method of claim 1,
wherein the alert comprising a human-readable description of the reference cycle allowed at runtime.

19. The method of claim 1, further comprising:
based on determining that the data type definition allows for the reference cycle at runtime, outputting the alert pertaining to the allowance of the reference cycle at runtime to a particular integrated development environment; and
wherein the particular integrated development environment uses the alert to automatically change the programming language source code for the library to avoid the reference cycle allowed at runtime based on a suggestion selected by a programming user.

* * * * *